US008526346B1

(12) United States Patent
Liu

(10) Patent No.: US 8,526,346 B1
(45) Date of Patent: Sep. 3, 2013

(54) POWER SAVE COMMUNICATION MECHANISM FOR WIRELESS COMMUNICATION SYSTEMS

(75) Inventor: Xiangyang Liu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 12/768,912

(22) Filed: Apr. 28, 2010

(51) Int. Cl.
*G08C 17/00* (2006.01)

(52) U.S. Cl.
USPC .......................................................... 370/311

(58) Field of Classification Search
USPC .......................................................... 370/311
See application file for complete search history.

(56) References Cited

U.S. PATENT DOCUMENTS

| | | |
|---|---|---|
| 6,421,714 B1 | 7/2002 | Rai et al. |
| 6,570,857 B1 | 5/2003 | Haartsen et al. |
| 6,580,704 B1 | 6/2003 | Wellig et al. |
| 6,829,493 B1 | 12/2004 | Hunzinger |
| 6,836,472 B2 | 12/2004 | O'Toole et al. |
| 7,260,068 B2 | 8/2007 | Hsieh et al. |
| RE40,032 E | 1/2008 | van Bokhorst et al. |
| 7,457,271 B2 | 11/2008 | Donovan |
| 7,505,795 B1 | 3/2009 | Lim et al. |
| 7,567,815 B2 | 7/2009 | Nishikawa et al. |
| 7,577,114 B2 | 8/2009 | Hsieh et al. |
| 7,804,849 B2 | 9/2010 | Mahany et al. |
| 7,864,720 B2 | 1/2011 | Jeyaseelan |
| 7,916,663 B2 | 3/2011 | Yee |
| 7,978,638 B2 | 7/2011 | Kim et al. |
| 7,995,507 B2 | 8/2011 | Singh et al. |
| 8,014,370 B2 | 9/2011 | Banerjea et al. |
| 8,023,522 B2 | 9/2011 | Gobriel et al. |
| 8,045,494 B2 | 10/2011 | Habetha et al. |
| 8,072,913 B2 | 12/2011 | Desai |

(Continued)

FOREIGN PATENT DOCUMENTS

EP 2157739 2/2010

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) Section 11; http://standards.ieee.org/getieee802/download/802.11-2007.pdf. (Date Obtained from Internet Apr. 6, 2010) Jun. 12, 2007, pp. 468-517.

(Continued)

*Primary Examiner* — Mark Rinehart
*Assistant Examiner* — Maharishi Khirodhar
(74) *Attorney, Agent, or Firm* — DeLizio Gilliam, PLLC

(57) ABSTRACT

A power saving communication mechanism can be implemented on an access point and on a connected WLAN device in a wireless communication network so that the connected WLAN device transmits uplink data frames in response to receiving a trigger frame from the access point. The access point determines a number of connected wireless network devices in the wireless communication network and a number of power save intervals to be implemented in each beacon interval. Additionally, the access point can vary a trigger frame transmission sequence according to which trigger frames are transmitted to connected WLAN devices. The access point transmits the trigger frame to each connected WLAN device to request transmission of uplink data frames based on the trigger frame transmission sequence. The power saving communication mechanism can improve throughput, facilitate conservation of radio resources, and reduce power consumption.

32 Claims, 12 Drawing Sheets

(56) References Cited

U.S. PATENT DOCUMENTS

| | | | |
|---|---|---|---|
| 8,098,635 B2 | 1/2012 | Montojo et al. | |
| 8,099,047 B2 | 1/2012 | David et al. | |
| 8,112,650 B2 | 2/2012 | Qing et al. | |
| 8,233,462 B2 | 7/2012 | Walton et al. | |
| 2002/0045435 A1* | 4/2002 | Fantaske | 455/403 |
| 2002/0164963 A1* | 11/2002 | Tehrani et al. | 455/101 |
| 2005/0135284 A1 | 6/2005 | Nanda et al. | |
| 2005/0136914 A1* | 6/2005 | van Kampen et al. | 455/426.2 |
| 2005/0152324 A1 | 7/2005 | Benveniste | |
| 2005/0286454 A1 | 12/2005 | Morimoto et al. | |
| 2006/0029024 A1 | 2/2006 | Zeng et al. | |
| 2007/0077936 A1* | 4/2007 | Tomisawa et al. | 455/450 |
| 2007/0171910 A1 | 7/2007 | Kumar | |
| 2008/0069021 A1 | 3/2008 | Chhabra | |
| 2009/0016248 A1 | 1/2009 | Li et al. | |
| 2009/0073945 A1 | 3/2009 | Seok | |
| 2009/0097438 A1 | 4/2009 | Kneckt et al. | |
| 2009/0196211 A1 | 8/2009 | Wentink | |
| 2009/0310578 A1 | 12/2009 | Convertino et al. | |
| 2010/0070767 A1 | 3/2010 | Walker et al. | |
| 2010/0118797 A1 | 5/2010 | Park et al. | |
| 2010/0128701 A1 | 5/2010 | Nagaraja | |
| 2010/0153727 A1 | 6/2010 | Reznik et al. | |
| 2010/0189021 A1* | 7/2010 | He et al. | 370/311 |
| 2010/0254290 A1 | 10/2010 | Gong et al. | |
| 2010/0284316 A1 | 11/2010 | Sampathkumar | |
| 2010/0325459 A1 | 12/2010 | Kangude et al. | |
| 2011/0051638 A1 | 3/2011 | Jeon et al. | |
| 2011/0086662 A1 | 4/2011 | Fong et al. | |
| 2011/0158142 A1 | 6/2011 | Gong et al. | |
| 2011/0237294 A1 | 9/2011 | Hussain | |
| 2011/0280170 A1 | 11/2011 | Bowser et al. | |
| 2012/0021735 A1 | 1/2012 | Maeder et al. | |
| 2012/0151089 A1 | 6/2012 | Ponmudi et al. | |
| 2013/0028206 A1 | 1/2013 | Cho et al. | |

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) Section 5; http://standards.ieee.org/getieee802/download/802.11-2007.pdf. (Date Obtained from Internet Apr. 6, 2010) Jun. 12, 2007, pp. 59-312.

Jung Eun-Sun et al., "A Power Control MAC Protocol for Ad Hoc Networks", 2002, 12 pages.
Co-pending U.S. Appl. No. 12/705,267, filed Feb. 12, 2010.
Co-pending U.S. Appl. No. 12/727,610, filed Mar. 19, 2010.
Co-pending U.S. Appl. No. 12/963,160, filed Dec. 8, 2010.
Co-pending U.S. Appl. No. 13/088,081, filed Apr. 15, 2011.
"U.S. Appl. No. 12/562,819 Office Action", Nov. 14, 2011, 26 pages.
IEEE Std 802.11z : IEEE Standard for Information Technology—Amendment 7: Extensions to Direct-Link Setup, IEEE Computer Society 3 Park AvenueNew York, NY 10016-5997 http://ieeexplore.ieee.org/xpl/freeabs_all.jsp?arnumber=5605400 Oct. 14, 2010, 96 pages.
IEEE, , "Wireless LAN Medium Access Control (MAC) and Physical Layer (PHY) Specifications", *IEEE Standard for Information Technology* Section 11.0, http://standards.ieee.org/getieee802/download/802.11-2007.pdf Jun. 12, 2007, pp. 419-468.
IEEE, , "Wireless LAN Medium Access Control (MAC) and Physical Layer (PHY) Specifications", *IEEE Standard for Information Technology* Section 7.0, http://standards.ieee.org/getieee802/download/802.11-2007.pdf Jun. 12, 2007, pp. 59-154.
U.S. Appl. No. 12/562,819, filed Sep. 18, 2009, Pitchaiah, Vijayaraja.
U.S. Appl. No. 12/492,405 Office Action, Sep. 27, 2012, 10 pages.
Co-pending U.S. Appl. No. 12/768,434, filed Apr. 27, 2010.
Co-pending U.S. Appl. No. 13/413,011, filed Mar. 6, 2012.
International Search Report and Written Opinion—PCT/US2011/062154—ISA/EPO—Mar. 6, 2012 (112366WO).
"U.S. Appl. No. 12/492,405 Office Action", Mar. 15, 2012, 9 pages.
"U.S. Appl. No. 12/562,819 Final Office Action", May 3, 2012, 32 pages.
"U.S. Appl. No. 12/705,267 Office Action", Mar. 22, 2012, 11 pages.
"U.S. Appl. No. 12/727,610 Office Action", Aug. 2, 2012, 20 pages.
"U.S. Appl. No. 12/768,434 Office Action", Oct. 15, 2012, 11 pages.
U.S. Appl. No. 12/562,819 Office Action, Feb. 5, 2013, 29 pages.
"U.S. Appl. No. 12/727,610 Final Office Action", Jan. 7, 2013, 24 pages.
"U.S. Appl. No. 12/768,434 Final Office Action", Mar. 20, 2013, 15 pages.
"PCT Application No. PCT/US11/62154 International Preliminary Report on Patentability", Jun. 20, 2013, 8 pages.
"PCT Application No. PCT/US2013/029377 International Search Report", Jun. 17, 2013, 11 pages.
"U.S. Appl. No. 12/963,160 Office Action", Apr. 16, 2013, 25 pages.
"U.S. Appl. No. 13/088,081 Non-Final Office Action", Apr. 24, 2013, 14 Pages.

* cited by examiner

POWER SAVE COMMUNICATION MECHANISM FOR WIRELESS COMMUNICATION SYSTEMS

BACKGROUND

Embodiments of the inventive subject matter generally relate to the field of wireless communication systems and, more particularly, to a power save communication mechanism for wireless communication systems.

Unscheduled automatic power save delivery (U-APSD) can be implemented on a wireless local area network (WLAN) device to ensure quality of service (QoS) by prioritizing traffic (e.g., voice, video, etc.) exchanged between the WLAN device and an access point. In U-APSD, a data frame transmitted from the WLAN device to the access point (an uplink data frame) is used to trigger the access point. When the access point receives the uplink data frame, the access point starts an unscheduled service period and transmits buffered downlink data frames (if available) to the WLAN device. At the end of the service period, the access point transmits an end of service period (EOSP) notification to indicate that the access point has no buffered downlink data to transmit.

SUMMARY

Various embodiments of a power save communication mechanism for wireless communication systems are disclosed. In one embodiment, it is determined, at an access point in a wireless communication system, that a plurality of wireless network devices of the wireless communication system are connected to the access point. A number of power save intervals to be implemented in each beacon interval during a power save communication mode of the wireless communication system is determined. The number of power save intervals is determined based, at least in part, on a number of wireless network devices that are connected to the access point. A trigger frame transmission sequence is determined for each of the power save intervals. The trigger frame transmission sequence indicates an order according to which the access point communicates with each of the plurality of wireless network devices connected to the access point during each of the power save intervals. A beacon frame, that comprises an indication of a duration of each of the power save intervals, is transmitted to initiate a beacon interval. In accordance with the trigger frame transmission sequence, a trigger frame is transmitted to a first wireless network device of the plurality of wireless network devices to request transmission of uplink data frames from the first wireless network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
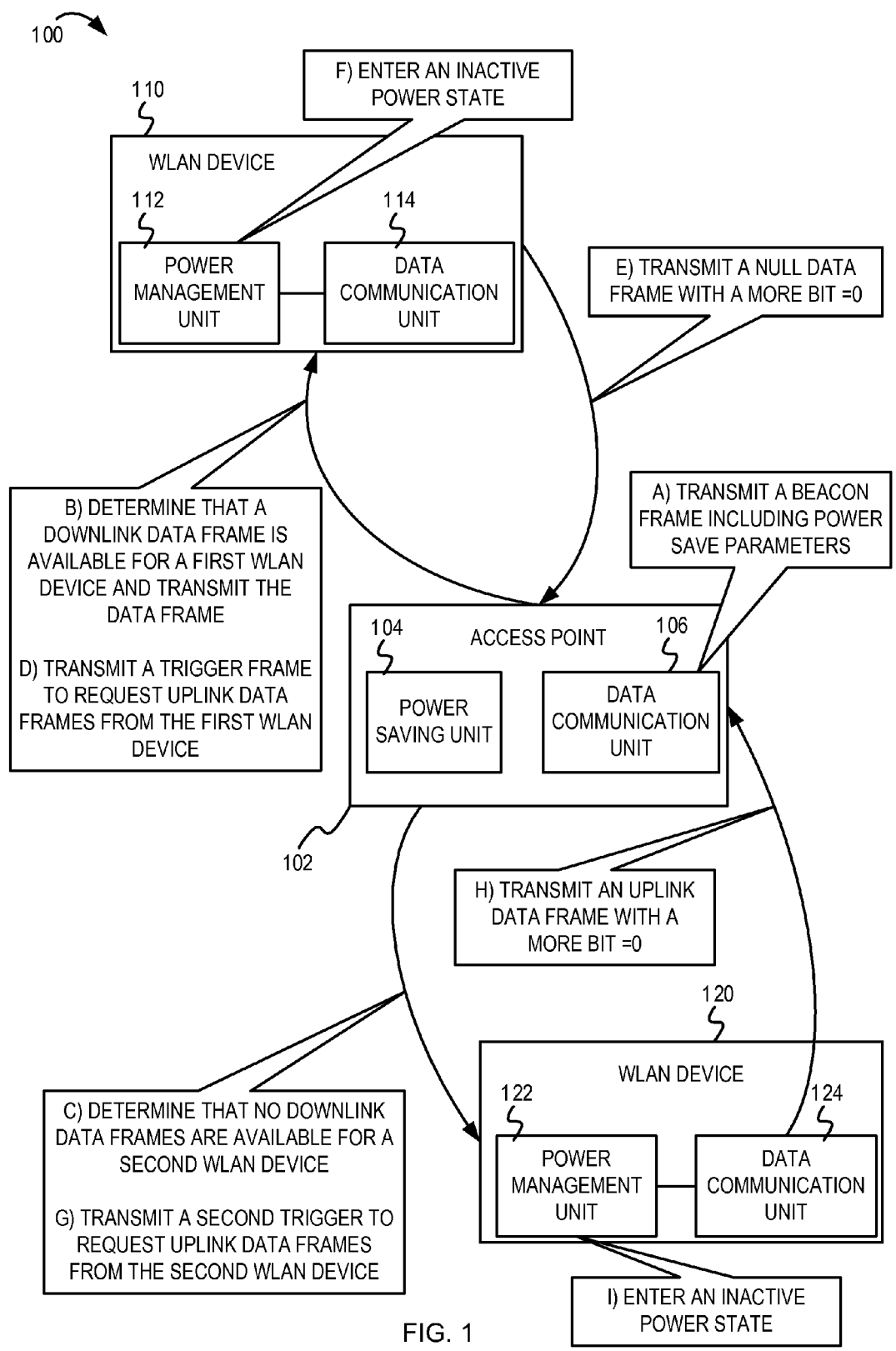
FIG. 1 is a conceptual diagram illustrating example operations for a power saving communication mechanism implemented by an access point in a wireless network.

The description that follows includes exemplary systems, methods, techniques, instruction sequences, and computer program products that embody techniques of the present inventive subject matter. However, it is understood that the described embodiments may be practiced without these specific details. For instance, although examples refer to data communication techniques for power conservation in a WLAN device, data communication techniques for power conservation as described below may be implemented for other wireless standards and devices, e.g., WiMAX, ZigBee®, Wireless USB devices, etc. In other instances, well-known instruction instances, protocols, structures, and techniques have not been shown in detail in order not to obfuscate the description.

Existing techniques for implementing APSD for power conservation on a WLAN device generally results in additional overhead and requires the access point to transmit downlink data frames in response to uplink data frames from the WLAN device. The existing techniques for implementing APSD can incur a large overhead as a result of the access point creating a service period on receiving the uplink data frame, transmitting an end of service period (EOSP) notification to indicate the end of the service period, the WLAN device transmitting an acknowledgement, and the access point retransmitting the EOSP notification if the acknowledgement is not received. The large overhead can limit the performance of the WLAN device, because the WLAN device may not achieve its maximum throughput.

A power save communication mechanism for efficient transmission of uplink data frames can be implemented on both the WLAN device and the access point. In some embodiments, the power save communication mechanism can be configured so that the WLAN device connected to the access point ("connected WLAN device") transmits the uplink data frames in response to receiving a trigger frame from the access point. In one example, the connected WLAN device can buffer the uplink data frames. On receiving the trigger frame from the access point, the connected WLAN device can transmit the buffered uplink data frames to the access point. At the start of each power save interval, the connected WLAN device can enter an active power state (i.e., a normal power state or a normal power range depending on power requirements of the connected WLAN device). During each power save interval, the connected WLAN device can receive downlink data frames (if any) from the access point, and receive the trigger frame from the access point requesting transmission of the uplink data frames. The connected WLAN device can enter an inactive power state (i.e., a sleep state or a low powered state) after the WLAN device responds to the trigger frame. When multiple WLAN devices are connected to the access point, the power save communication mechanism can help ensure that each connected WLAN device is allotted time to transmit the uplink data frames. To attempt to achieve approximately uniform power consumption across the connected WLAN devices, the access point can vary a trigger frame transmission sequence across the connected WLAN devices at each power save interval. In other words, varying the order in which the connected WLAN devices receive the trigger frame and transmit the uplink data frames can help ensure that all the connected WLAN devices remain in the active power state for an approximately constant time interval and that the connected WLAN devices consume an approximately constant amount of power. The power save communication mechanism can therefore improve throughput, facilitate conservation of radio resources, and reduce power consumption.

FIG. 1 is a conceptual diagram illustrating example operations for a power saving communication mechanism implemented by the access point in a wireless network 100. FIG. 1 depicts an access point 102, a WLAN device 110, and a WLAN device 120. The WLAN device 110 and the WLAN device 120 are wirelessly connected to communicate with the access point 102. In the example shown in FIG. 1, the access point 102 comprises a power saving unit 104 coupled to a data communication unit 106. The WLAN device 110 comprises a power management unit 112 coupled to a data communication unit 114. Also, the WLAN device 120 comprises a power management unit 122 coupled to a data communication unit 124.

Figure 2A:
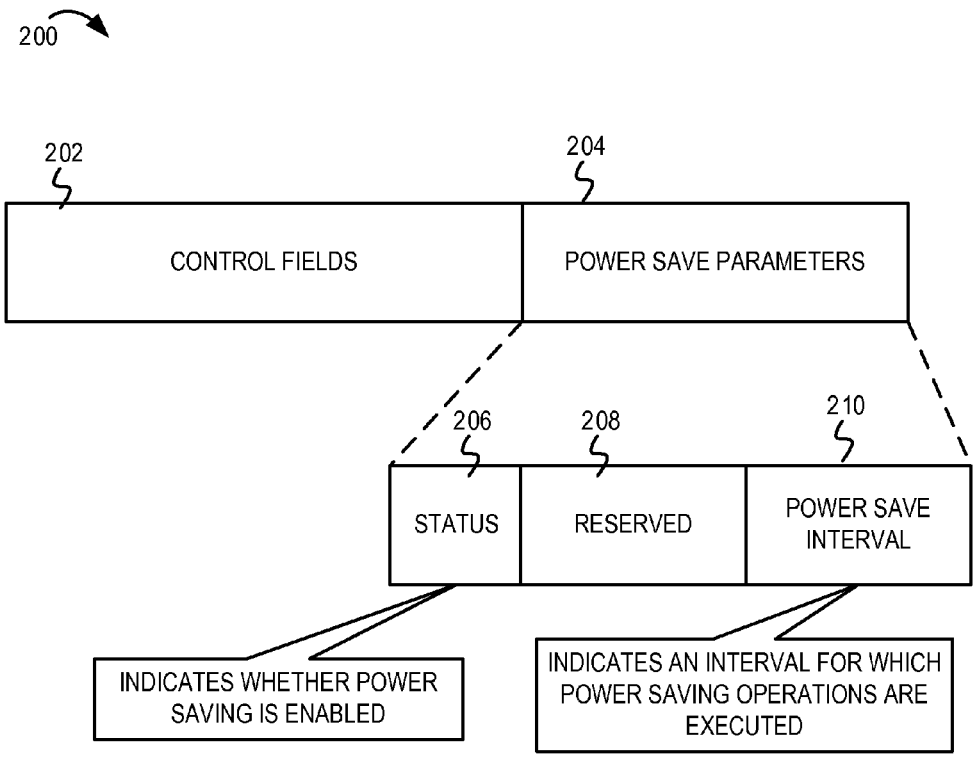
FIG. 2A illustrates an example format of a beacon frame.

In some implementations, at stage A, the data communication unit 106 in the access point 102 transmits a beacon frame including power save parameters. The data communication unit 106 can transmit the beacon frame at the start of each beacon interval to the WLAN devices of the network 100. In the example of in FIG. 1, the WLAN devices 110 and 120 receive the beacon frame from the access point 102. Other WLAN devices that are not connected to the access point 102 may also receive the beacon frame and determine whether to connect to the access point 102. FIG. 2A illustrates an example format of a beacon frame 200. The beacon frame 200 comprises control fields 202 and power save parameters 204. In one example, the control fields 202 may indicate an element identifier, a frame length, a communication protocol version number, and other information describing transmission capabilities of the access point 102. The power save parameters 204 may comprise a status field 206, reserved fields 208, and a power save interval field 210. The power save parameters 204 provide information to support power saving in communications between the access point 102 and the WLAN devices 110 and 120. In one example, the status field 206 may be a 1-bit field. A value of "0" in the status field 206 can indicate that a power save communication mode is disabled in the access point 102, while a value of "1" in the status field 206 can indicate that the power save communication mode is enabled in the access point 102. The reserved field 208 may be a 7-bit field reserved for future use. The power save interval field 210 may be a 1-byte (8-bit) field. The power save interval field 210 can indicate a power save interval, which is a time interval during each beacon interval when the access point 102 and the WLAN devices 110 and 120 will execute power saving operations for communication, as will be further described below. In some implementations, the power save interval may be represented in milliseconds. It should be noted, however, that in other embodiments the beacon frame 200 and the power save parameters 204 could comprise any suitable number of fields, with any suitable length (i.e., number of bits assigned to each of the fields).

In some embodiments, the access point 102 can divide each beacon interval into multiple power save intervals. The power save interval may be calculated so that the beacon interval is a multiple of the power save interval. For example, if the beacon interval is 200 ms, the power save interval may be set to 50 ms. Thus, in this example, each beacon interval comprises four power save intervals. In one implementation, the number of power save intervals that constitute each beacon interval can depend on the number of WLAN devices connected to the access point 102. In the example of FIG. 1, two WLAN devices 110 and 120 are connected to the access point 102. Therefore, in this example, the beacon interval can comprise two power save intervals. It is noted, however, that in other implementations, the beacon interval can constitute any suitable number of power save intervals (e.g., determined based on the amount time associated with the beacon interval). For example, if the duration of the beacon interval does not allow the number of power save intervals to be equal to the number of connected WLAN devices to the access point 102 (e.g., the beacon interval is not a multiple of the number of connected WLAN devices), the access point 102 may implement as many power save intervals as possible within the beacon interval. In these embodiments, the access point 102 can determine the maximum number of power save intervals that can be implemented within the beacon interval based on the number of connected WLAN devices, a time to transmit an uplink frame, a maximum allowable uplink frame length, a communication protocol implemented by the connected WLAN devices, etc. For example, the access point 102 may determine that there are four connected WLAN devices and that a maximum of three power save intervals can be implemented within the beacon interval. Thus, the access point 102 may implement three power save intervals within the beacon interval. As another example, if the access point 102 determines that there are ten connected WLAN devices and that a maximum of six power save intervals can be implemented within the beacon interval, the access point 102 may implement only six power save intervals within the beacon interval. In yet another embodiment, the access point 102 may vary the duration of the beacon interval so that the number of power save intervals equals the number of connected WLAN devices. In one implementation, in each power save interval of a beacon interval, the access point 102 may vary the sequence in which the access point 102 sends trigger frames to the connected WLAN devices, as will be further described below with reference to FIG. 5 and FIG. 9.

At stage B, after transmitting the beacon frame, the data communication unit 106 determines that a downlink data frame is available for the WLAN device 110. The data communication unit 106 may access a transmit data buffer (not shown) and determine that the downlink data frame is available for the WLAN device 110. The data communication unit 106 transmits the downlink data frame to the WLAN device 110.

At stage C, the data communication unit 106 determines that no downlink data frames are available for the WLAN device 120. The data communication unit 106 may access the transmit data buffer and determine that the downlink data frames are not available for the WLAN device 120. In some implementations, the data communication unit 106 may transmit a notification (e.g., a NULL data frame) to the WLAN device 120 indicating that no downlink data frames are available for the WLAN device 120. In another implementation, the data communication unit 106 may not transmit the notification to the WLAN device 120 if the data communication unit 106 determines that there are no downlink data frames for the WLAN device 120.

Figure 2B:
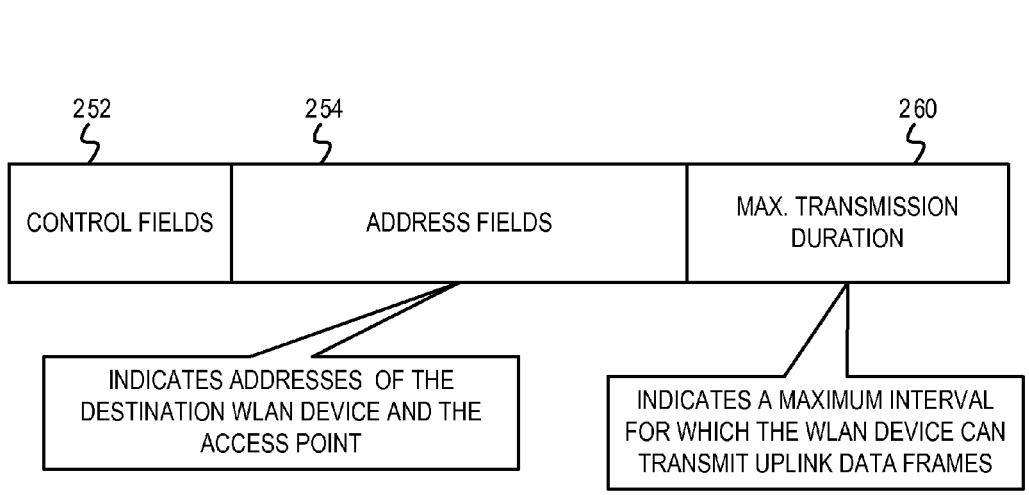
FIG. 2B depicts an example format of a trigger frame.

At stage D, during a first power save interval, the data communication unit 106 transmits a trigger frame to the WLAN device 110 to request uplink data frames from the WLAN device 110. FIG. 2B depicts an example format of a trigger frame 250. As illustrated, in one example, the trigger frame 250 comprises control fields 252, address fields 254, and a maximum transmission duration field 260. The control fields 252 can indicate an element identifier, a frame length, a version number, a type of frame being transmitted, a duration for which the communication medium will be in use, etc. The address fields 254 can indicate the address of a destination WLAN device and the address of the access point. In one example, the data communication unit 102 can transmit a value of 1000 as part of the control fields 252 to indicate that the transmitted frame is a trigger frame. In some implementations, the order in which the address of the destination WLAN device and the address of the access point 102 are transmitted can indicate that the trigger frame 250 is being transmitted from the access point 102 to the WLAN device 110. The maximum transmission duration field 264 can indicate a maximum time interval available to the WLAN device (that receives the trigger frame 250) for transmitting uplink data frame(s) to the access point 102 during the associated power save interval. The maximum transmission duration field 264 can indicate the maximum time interval available to the WLAN device for responding to the trigger frame 250 (e.g., transmitting an acknowledgement, transmitting a data frame or NULL data frame, etc.). The data communication unit 106 can determine the maximum transmission duration that should be allocated to the WLAN device 110 based on the number of WLAN devices connected to the access point 102, based on the maximum length of an uplink data packet that can be transmitted by the WLAN device 110, etc., as will be further described below. It is noted that the trigger frame 250 depicted in FIG. 2B is an example. In other implementations, the trigger frame 250 could comprise additional data fields or fewer data fields. The data fields may comprise any suitable number of bits. Moreover, the data communication unit 106 can transmit other suitable predefined values to indicate the transmission of the trigger frame to the WLAN devices.

At stage E, the data communication unit 114 in the WLAN device 110 determines that there are no available uplink data frames for the access point 102. The data communication unit 114 can transmit a NULL data frame and set a "more bit" in the header of the NULL frame to indicate to the access point that the WLAN device 110 does not have uplink data frames. In some implementations, prior to transmitting the NULL data frame, the data communication unit 114 may determine whether the NULL data frame can be transmitted within the maximum transmission duration 260 (indicated in the trigger frame 250) allotted to the WLAN device 110 (as will be further described below with reference to FIGS. 7 and 8). If so, the data communication unit 114 can transmit the NULL data frame to the access point 102. Otherwise, the data communication unit 114 may not transmit any frames to the access point 102.

At stage F, the power management unit 112 in the WLAN device 110 causes the WLAN device 110 to enter an inactive power state. In one example, the power management unit 112 can transmit a notification to the data communication unit 114 and to other processing components of the WLAN device 110 indicating that the WLAN device 110 should enter an inactive power state. In one example, the WLAN device 110 may enter the active power state at a next power save interval (or other predefined time interval) to receive downlink data frames from the access point 102, to transmit uplink data frames to the access point 102, etc.

At stage G, the data communication unit 106 transmits a trigger frame to the WLAN device 120 to request uplink data frames from the WLAN device 120. Similarly as described above (with reference to stage D), the data communication unit 106 may transmit a value of 1000 as part of the control fields 252 to indicate that the transmitted frame is a trigger frame. The data communication unit 106 may also transmit the address of the destination WLAN device 120 and the address of the access point 102 in the address fields 254 to indicate that the trigger frame is being transmitted from the access point 102 to the WLAN device 120. In the maximum transmission duration field 264, the data communication unit 106 can indicate a maximum time interval available to the WLAN device 120 for transmitting uplink data frame(s) or for responding to the trigger frame 250.

At stage H, the data communication unit 124 in the WLAN device 120 determines that an uplink data frame is available for transmission to the access point 102. The data communication unit 124 then transmits the uplink data frame to the access point 102. The data communication unit 124 can set a "more bit" in a header of the uplink data frame to a first value to indicate that there are no additional uplink data frames for the access point 102. For example, the data communication unit 124 may set the "more bit" to zero (i.e., more bit=0) to indicate that there are no additional uplink data frames for the access point 102. Alternately, the data communication unit 124 may set the "more bit" to one (i.e., more bit=1) if the data communication unit 124 determines that there are additional uplink data frames that are scheduled to be transmitted to the access point 102. It is noted that in some implementations, prior to transmitting the uplink data frame, the data communication unit 124 may determine whether the uplink data frame(s) can be transmitted within the maximum transmission duration 260 (indicated in the trigger frame 250) allotted to the WLAN device 120 for uplink data transmissions. If so, the data communication unit 124 can determine a number of uplink data frames that can be transmitted within the maximum transmission duration 260 and transmit the uplink data frames to the access point 102. Otherwise, the data communication unit 124 may transmit a NULL data frame or may not transmit any frames to the access point 102.

At stage I, the power management unit 122 causes the WLAN device 120 to enter an inactive power state. In one example, the power management unit 122 can transmit a notification to the data communication unit 124 and to other processing components of the WLAN device 120 indicating that the WLAN device 120 should enter an inactive power state. The WLAN device 120 may enter the active power state at a next power save interval (or after another suitable predefined time interval) to receive downlink data frames from the access point 102, transmit uplink data frames to the access point 102, etc.

It should be noted that although FIG. 1 describes the access point 102 transmitting available downlink data frames to all the connected WLAN devices (e.g., the WLAN devices 110 and 120) prior to transmitting the trigger frames, embodiments are not so limited. In some implementations, the access point 102 may transmit the trigger frame to the WLAN device 110 (at stage D) after the access point 102 transmits the downlink data frame(s) for the WLAN device 110. Then, after the access point 102 receives the uplink data frames (or receives an indication that there are no uplink data frames) from the WLAN device 110, the access point may transmit (if available) downlink data frames to the WLAN device 120 and may then transmit the trigger frame to the WLAN device 120.

Figure 3:
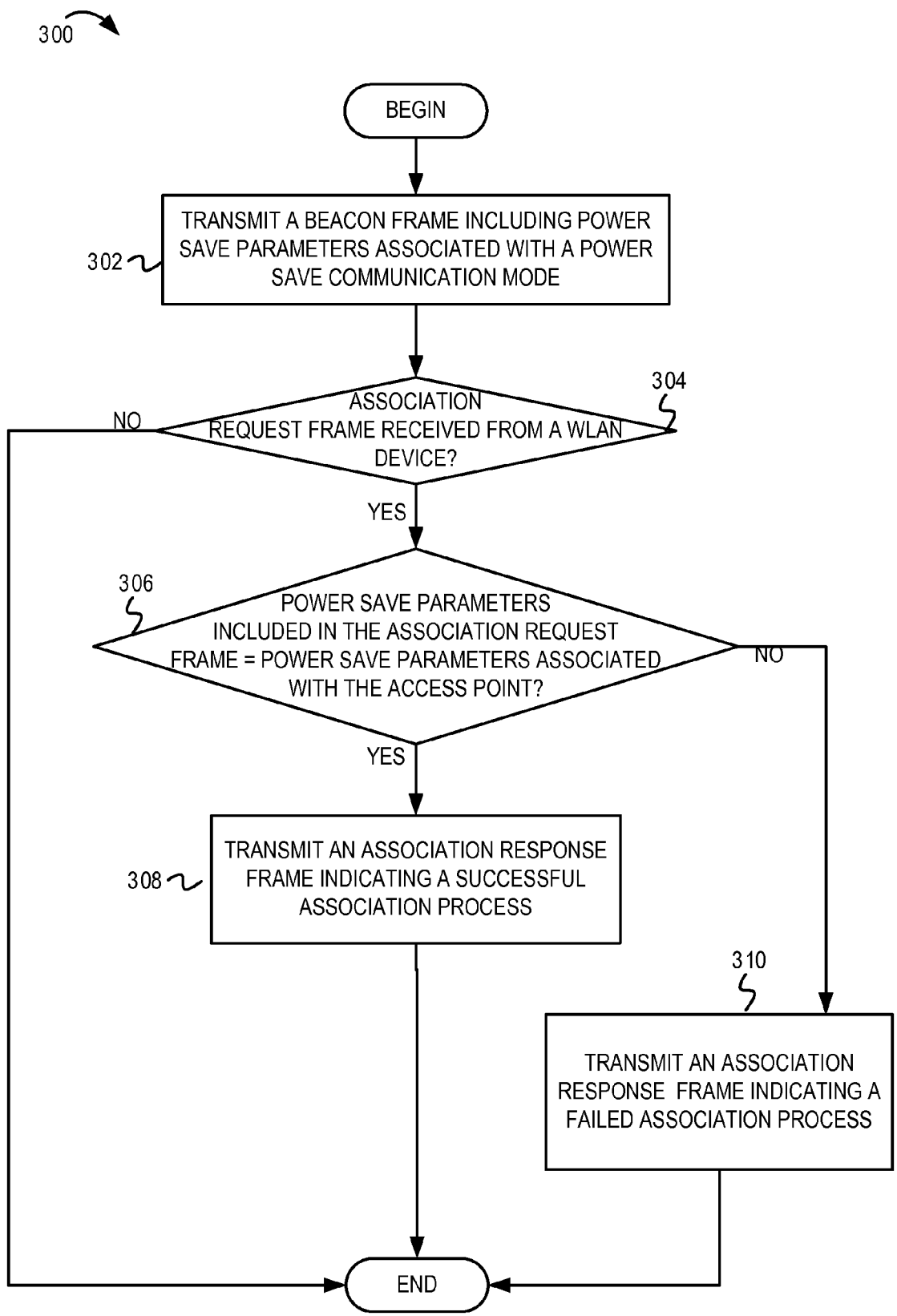
FIG. 3 is a flow diagram illustrating example operations for an association process between a WLAN device and an access point.

FIG. 3 is a flow diagram ("flow") 300 illustrating example operations for an association process between a WLAN device and an access point. The flow 300 begins at block 302.

At block 302, a beacon frame including power save parameters associated with a power save communication mode is transmitted. For example, in FIG. 1, the data communication unit 106 in the access point 102 creates a beacon frame (e.g., the beacon frame 200 of FIG. 2A) comprising the power save parameters 204. At the start of each beacon interval, the power saving unit 104 in the access point 102 can cause the data communication unit 106 and other processing components of the access point 102 to enter an active power state. The data communication unit 106 can transmit the beacon frame at the start of each beacon interval after the access point 102 enters the active power state. The flow continues at block 304.

At block 304, it is determined whether an association request frame was received from a WLAN device. In one example, a WLAN device may transmit the association request frame to the access point 102 to connect to the access point 102, to indicate communication parameters associated with the WLAN device, etc. The association request frame may also comprise power save parameters associated with the WLAN device. It should be noted that, in some implementations, prior to transmitting the association request frame, the WLAN device that is attempting to connect to the access point 102 may transmit a probe request frame and may receive a probe response frame from the access point 102. If it is determined that the association frame was received from the WLAN device, the flow continues at block 306. Otherwise, the flow ends.

At block 306, it is determined whether the power save parameters included in the association request frame match the power save parameters associated with the access point. For example, the power saving unit 104 may read the power save parameters included in the association request frame. The power saving unit 104 may compare the power save parameters included in the association request frame with the power save parameters associated with the access point 102. For example, the power saving unit 104 may determine whether the power save communication mode is enabled in the access point 102 and in the WLAN device that transmitted the association request frame. If it is determined that the power save parameters included in the association request frame match the power save parameters associated with the access point, the flow continues at block 308. Otherwise, the flow continues at block 310.

At block 308, an association response frame that indicates a successful association process is transmitted. For example, the data communication unit 106 transmits the association response frame to indicate the WLAN device that transmitted the association request frame is successfully connected to the access point 102. The data communication unit 106 may also transmit, as part of the association response frame, a first value of a status code to indicate success of the association process. As one example, the data communication unit 106 may transmit a status code of 0x00 to indicate that the association process is successful. In other embodiments, the data communication unit 106 may transmit other suitable predefined status codes to indicate success of the association process. From block 308, the flow ends.

At block 310, an association response frame that indicates a failed association process is transmitted. For example, the data communication unit 106 transmits the association response frame to indicate the WLAN device that transmitted the association request frame is not connected to the access point 102. The data communication unit 106 may also transmit, as part of the association response frame, a second value of the status code to indicate failure of the association process. As one example, the data communication unit 106 may transmit a status code of 0x40 to indicate that the failure of the association process. In other embodiments, the data communication unit 106 may transmit any suitable predefined status code to indicate that the failure of the association process. From block 310, the flow ends.

It should be noted that, after the flow 300 ends (i.e., after the access point 102 determines that association request frame was not received, or after the access point 102 transmits the association response frame indicating success/failure of the association process), the access point 102 may transmit downlink data frames and trigger frames to connected WLAN devices (if any), as described below with reference to FIG. 5 and FIG. 6.

Figure 4:
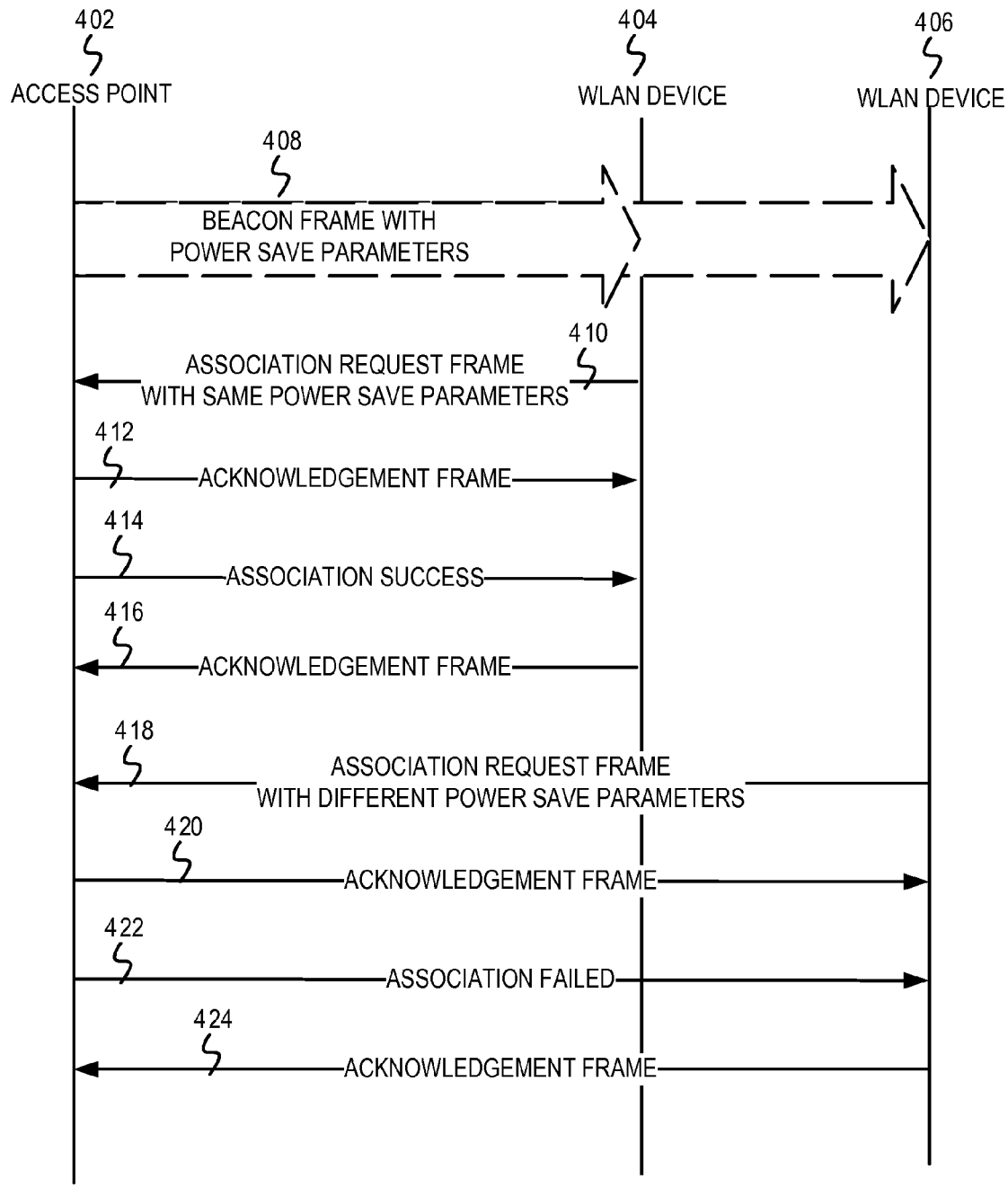
FIG. 4 depicts an example sequence diagram illustrating an association process between an access point and WLAN devices.

FIG. 4 depicts an example sequence diagram illustrating an association process between an access point and the WLAN devices connected to the access point ("connected WLAN devices"). FIG. 4 depicts an access point 402, a WLAN device 404, and a WLAN device 406. In the example shown in FIG. 4, the access point 402 transmits a beacon frame 408 comprising power save parameters to the WLAN device 404 and the WLAN device 406. The WLAN devices 404 and 406 may not be connected to the access point 402 but may receive the beacon frame 408 and may attempt to establish a connection with the access point 402. The WLAN device 404 transmits an association request frame 410 comprising power save parameters to the access point 402. The access point 402 transmits an acknowledgement frame 412 to indicate that the access point 402 received the association request frame 410. The access point 402 analyses parameters associated with the association request frame 410 (e.g., compares the power save parameters transmitted by the WLAN device 404 with the power save parameters associated with the access point 402). Based, at least in part, on determining that the power save parameters associated with the WLAN device 404 match the power save parameters associated with the access point 402 (e.g., both have the power save communication mode enabled), the access point 402 transmits an association success frame 414. In response to receiving the association success frame 414, the WLAN device 404 transmits an acknowledgement frame 416.

The WLAN device 406 transmits an association request frame 418 comprising power save parameters that are different from the power save parameters transmitted by the access point 402 in the beacon frame 408. The access point 402 transmits an acknowledgement frame 420 to confirm receipt of the association request frame 418. Based, at least in part, on determining that the power save parameters associated with the WLAN device 406 do not match the power save parameters associated with the access point 402, the access point 402 transmits an association failed frame 422. In response to receiving the association failed frame 422, the WLAN device 406 transmits an acknowledgement frame 424. In other words, the access point 402 only successfully associates with WLAN devices that have matching power save parameters as the access point 402 (e.g., both have the power save communication mode enabled).

Although FIG. 3 and FIG. 4 illustrate operations for an association process between the access point and WLAN devices, the above-described operations can also be extended to a reassociation process between the access point and the WLAN devices. For example, a WLAN device can transmit a reassociation request frame (comprising the power save parameters) to the access point. The access point can compare the power save parameters included in the reassociation request with the power save parameters associated with the access point. Accordingly, the access point can transmit a reassociation response frame to the WLAN device indicating a successful (status code=0x00) or a failed (status code=0x40) reassociation process.

The access point 102 can also use a reason code field to indicate a reason that the access point 102 transmits a rejection to a management frame (e.g., a disassociation request, an authentication frame, etc.) from the WLAN device. In one example, the access point 102 may transmit a reason code of 0x40 in a disassociation response frame to indicate that the WLAN device was disassociated because the power save parameters associated with the WLAN device do not match the power save parameters associated with the access point 102. It should be noted that in other embodiments, any suitable predefined reason code might be transmitted to indicate rejection of the WLAN device because of a mismatch in power save parameters.

Figure 5:
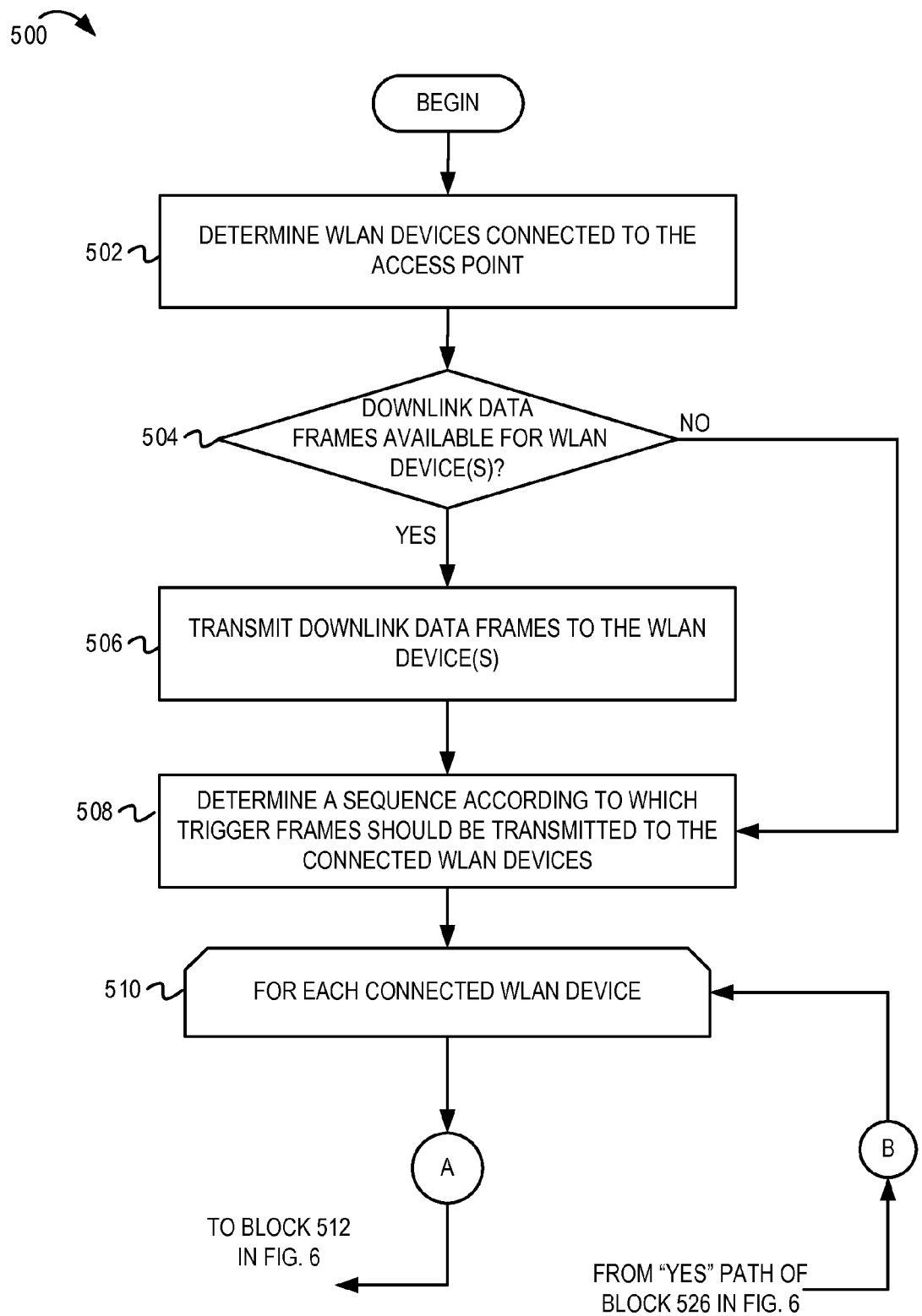
FIG. 5 depicts a flow diagram illustrating example operations of an access point communicating with one or more connected WLAN devices during a power save communication mode.
Figure 6:
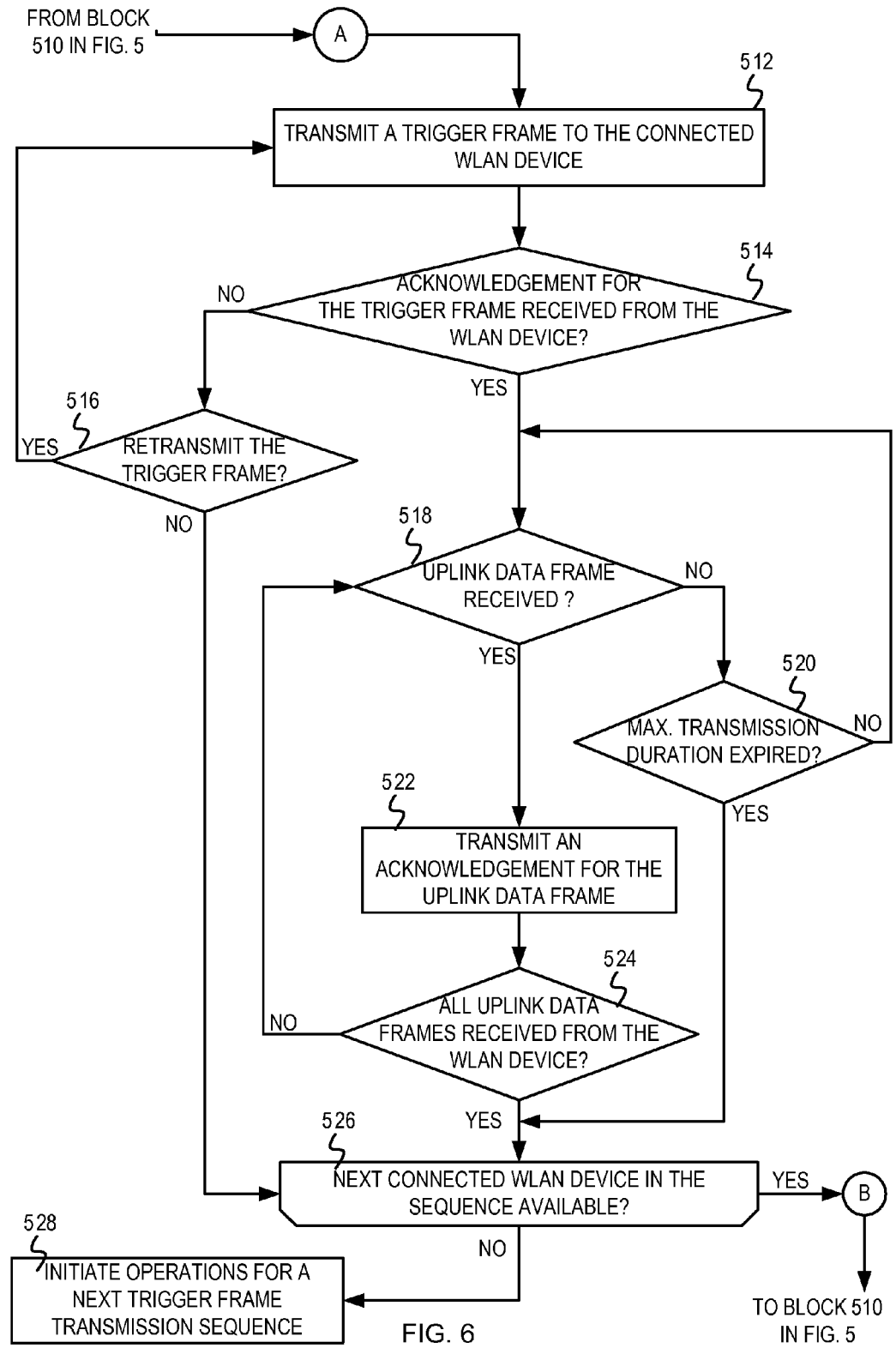
FIG. 6 depicts the flow diagram illustrating example operations of the access point communicating with the one or more connected WLAN devices during the power save communication mode.

FIG. 5 and FIG. 6 depict a flow diagram 500 illustrating example operations of an access point communicating with one or more connected WLAN device during a power save communication mode. The flow 500 begins at block 502 in FIG. 5.

At block 502, the WLAN devices connected to the access point are determined. For example, the data communication unit 106 in the access point 102 can determine that the WLAN devices 110 and 120 are connected to the access point 102. The data communication unit 106 may identify the connected WLAN devices based on previously exchanged association request/response frames. In some implementations, the data communication unit 106 may also access a data structure maintained by the access point 102 for the connected WLAN devices, and determine a number of connected WLAN devices, an address (e.g., a medium access control (MAC) address or other device identifier) for each connected WLAN device, etc. The flow continues at block 504.

At block 504, it is determined whether downlink data frames are available for at least one connected WLAN device. For example, the data communication unit 106 can access a transmit data buffer and determine whether downlink data frames are scheduled to be transmitted for at least one connected WLAN device. The data communication unit 106 can determine that there are no downlink data frames to be transmitted if the transmit data buffer is empty. If it is determined that downlink data frames are available for at least one connected WLAN device, the flow continues at block 506. Otherwise, the flow continues at block 508.

At block 506, the downlink data frames are transmitted to the WLAN device(s). For example, the data communication unit 106 can transmit the downlink data frames to the WLAN device(s). The data communication unit 106 can access the transmit data buffer and/or read a header of the downlink data frame and determine that the downlink data frame should be transmitted to the WLAN device 110. In some implementations, the data communication unit 106 may wait for a predefined time interval to receive an acknowledgement frame for the transmission of the downlink data frames. The data communication unit 106 can retransmit the downlink data frames if the WLAN device 110 does not transmit the acknowledgement frame. In other implementations, the data communication unit 106 may not require the WLAN device 110 to transmit the acknowledgement frame. After the data communication unit 106 transmits the downlink data frames to the WLAN device(s), the flow continues at block 508.

At block 508, a sequence according to which trigger frames should be transmitted ("trigger frame transmission sequence") to the connected WLAN devices is determined. For example, the power saving unit 104 in the access point 102 can determine the trigger frame transmission sequence for the connected WLAN devices. As described above, each beacon interval can comprise multiple power save intervals. As described with reference to FIG. 1, the number of power save intervals that constitute the beacon interval can depend on the number of connected WLAN devices. In one implementation, the number of power save intervals can equal the number of connected WLAN devices. In another implementation, if the duration of the beacon interval does not allow the number of power save intervals to be equal to the number of connected WLAN devices, any suitable number of power save intervals may be implemented within the beacon interval. The duration of the power save interval and consequently the number of power save intervals within the beacon interval may be determined based on an uplink data frame size, a transmission time for transmitting the uplink data frame, etc. The access point 102 may also be configured to vary the length of the beacon interval to accommodate a requisite number of power save intervals.

During each power save interval, the access point 102 can prompt (by transmitting trigger frames) the connected WLAN devices to transmit buffered uplink data frames. All the connected WLAN devices enter an active power state at the beginning of each power save interval. The connected WLAN devices can revert back to an inactive power state after they receive the trigger frame and transmit the uplink data frames. Therefore, while one of the connected WLAN devices is transmitting uplink data frames, other connected WLAN devices remain in the active power state as they wait for the trigger frame from the access point 102. This can result in some WLAN devices remaining in the active state (or a high-powered state) for much longer as compared to other WLAN devices.

To ensure that all the connected WLAN devices are in the active power state for approximately the same amount of time each beacon interval (e.g., to consume an approximately equal amount of power), the access point 102 varies the trigger frame transmission sequence at each power save interval. For example, three WLAN devices (e.g., WLAN devices A, B, and C) may be connected to the access point 102. As described above, in one embodiment, since three WLAN devices are connected to the access point 102, the beacon interval can comprise three power save intervals. During a first power save interval, the first trigger frame transmission sequence for the connected WLAN devices may be: (1) WLAN device A, (2) WLAN device B, and (3) WLAN device C. In other words, during the first power save interval, the access point 102 first transmits a trigger frame to, and receives uplink data frames from, the WLAN device A. The WLAN device A then enters the inactive power state. The access point 102 transmits a second trigger frame to, and receives uplink data frames from, the WLAN device B. The WLAN device B then enters the inactive power state. Lastly, the access point 102 transmits a third trigger frame to, and receives uplink data frames from, the WLAN device C. The WLAN device C then enters the inactive power state. At the start of the second power save interval, the WLAN devices A, B, and C enter the active power state. The access point 102 transmits triggers frames to, and receives uplink data frames from, the WLAN devices according to a second trigger frame transmission sequence: (1) WLAN device B, (2) WLAN device C, and (3) WLAN device A. At the start of the third power save interval, the access point 102 transmits triggers frames to, and receives uplink data frames from, the WLAN devices according to a third trigger frame transmission sequence: (1) WLAN device C, (2) WLAN device A, and (3) WLAN device B. An initial sequence according to which each connected WLAN device should be accessed may be determined based on arranging the WLAN devices in an order in which the WLAN devices connected to the access point 102, in ascending order of the WLAN device's identifiers, in descending order of the WLAN device's identifiers, etc. The flow continues at block 510.

At block 510, a loop begins to perform a set of operations (described in blocks 512-526 of FIG. 6) on each connected WLAN device. The flow continues at block 512 in FIG. 6.

At block 512 in FIG. 6, a trigger frame is transmitted to one of the connected WLAN devices during the first power save interval. For example, the data communication unit 106 transmits the trigger frame to the WLAN device 110. The data communication unit 106 can determine the WLAN device to which to trigger frame should be transmitted based on the trigger frame transmission sequence (determined at block 508) for the first power save interval. The trigger frame serves as an indication, to the WLAN device 110, that the WLAN device 110 may begin transmitting uplink data frames (if any) to the access point 102. As depicted in FIG. 2B, the trigger frame 250 can indicate a maximum transmission duration that is allotted to the WLAN device 110 for transmitting the uplink data frames. As one example, the data communication unit 106 can determine the maximum transmission duration based on a number of WLAN devices connected to the access point 102 and based on the power save interval. For example, if the power save interval is 50 msec and two WLAN devices are connected to the access point 102, the data communication unit 106 may determine that each WLAN device should be allotted a maximum transmission duration of 25 msec. As another example, the data communication unit 106 can determine the maximum transmission duration based on a maximum length of an uplink data frame that can be transmitted by the WLAN device 110. The WLAN device 110 may communicate the maximum length of the uplink data frame during an association process, or during another communication. As another example, the data communication unit 106 may determine the maximum transmission duration based on knowledge of a communication protocol implemented by the WLAN device 110. For example, based on knowledge that the WLAN device 110 implements a TCP/IP protocol, the data communication unit 106 can determine that the size of the uplink data frame cannot exceed a predefined number of bytes (e.g., 1500 bytes). Accordingly, in this example, the data communication unit 106 can calculate the maximum transmission duration so that the WLAN device 110 can transmit at least one uplink data frame during the maximum transmission duration. The flow continues at block 514.

At block 514, it is determined whether an acknowledgement frame for the trigger frame was received from the WLAN device. For example, the data communication unit 106 determines whether the acknowledgement frame was received from the WLAN device 110. The data communication unit 106 may wait for a predefined time interval to receive the acknowledgement frame from the WLAN device 110. If it is determined that the acknowledgement frame for the trigger frame was not received from the WLAN device, the flow continues at block 516. Otherwise, the flow continues at block 518.

At block 516, it is determined whether the trigger frame should be retransmitted to the WLAN device. For example, the data communication unit 106 may determine whether the trigger frame should be retransmitted to the WLAN device 110. In determining whether the trigger frame should be retransmitted to the WLAN device 110, the data communication unit 106 may determine whether the maximum transmission duration has expired. As indicated above, the maximum transmission duration may be a predefined time interval allotted to the WLAN device 110 for responding to the trigger from the access point 102. The data communication unit 106 may not attempt to communicate with the WLAN device 110 after the maximum transmission duration expires. In another implementation, the data communication unit 106 may retransmit the trigger frame only a specified number of times. For example, the data communication unit 106 may be configured to retransmit the trigger frame a maximum of 5 times. The data communication unit 106 may not attempt to communicate with the WLAN device 110 if the acknowledgement frame is not received after the fifth retransmission of the trigger frame. If it is determined that the trigger frame should not be retransmitted to the WLAN device, the flow continues at block 526. Otherwise, the flow loops back to block 512 where the trigger frame is retransmitted to the WLAN device.

At block 518, it is determined whether an uplink data frame is received from the WLAN device. For example, the data communication unit 106 can determine whether the uplink data frame was received from the WLAN device 110. The flow 500 moves from block 514 to block 518 if the data communication unit 106 determines that the acknowledgement frame for the trigger frame was received. The uplink data frame may comprise information to be communicated to another WLAN device 120 connected to the access point 102. Alternately, the uplink data frame may be a NULL data frame that indicates absence of uplink data frames from the WLAN device 110. If it is determined that the uplink data frame was received from the WLAN device, the flow continues at block 522. Otherwise, the flow continues at block 520.

At block 520, it is determined whether the maximum transmission duration has expired. For example, the data communication unit 106 can determine whether the maximum transmission duration has expired. As described above, the maximum transmission duration can indicate a time interval allotted to the WLAN device 110 for transmitting uplink data frames to the access point 102. If it is determined that the maximum transmission duration has expired, the flow continues at block 526. If it is determined that the maximum transmission duration has not expired, the flow loops back to block 518 where the data communication unit 106 waits to receive the uplink data frame from the WLAN device.

At block 522, an acknowledgement is transmitted to the WLAN device for the received uplink data frame. The flow 500 moves from block 518 to block 522 on determining that the uplink data frame was received from the WLAN device 110. For example, the data communication unit 106 transmits the acknowledgement for the received uplink data frame to the WLAN device 110. The flow continues at block 524.

At block 524, it is determined whether all uplink data frames have been received from the WLAN device. For example, the data communication unit 106 can determine whether the WLAN device 110 will transmit additional uplink data frames. The data communication unit 106 can read a "more bit" in the header of the received uplink data frame and determine whether the WLAN device 110 will transmit additional uplink data frames. In one implementation, the "more bit" being set to "1" can indicate that the WLAN device 110 will transmit one or more additional uplink data frames to the access point 102. The "more bit" being set to "0" can indicate that the WLAN device 110 will not transmit another uplink data frame to the access point 102. If it is determined that all the uplink data frames have been received from the WLAN device, the flow continues at block 526. Otherwise, the flow loops back to block 518, where the access point waits to receive a next uplink data frame.

At block 526, it is determined whether a next connected WLAN device in the trigger frame transmission sequence can be identified. The flow 500 moves from block 524 to block 526 if the data communication unit 106 determines that it has received all the uplink data frames from the WLAN device 110. The flow 500 also moves form block 516 to block 526 if the data communication unit 106 determines that the trigger frame should not be retransmitted to the WLAN device 110. Additionally, the flow 500 moves from block 520 to block 526 if the data communication unit 106 determines that the maximum transmission duration for receiving uplink data frames from the WLAN device 110 has expired. If it is determined that the next connected WLAN device in the trigger frame transmission sequence can be identified, the flow continues at block 510 in FIG. 5 where the next connected WLAN device is identified and a trigger frame requesting transmission of uplink data frames is transmitted to the next connected WLAN device. If it is determined that the access point 102 has transmitted a trigger frame to the last WLAN device in the trigger frame transmission sequence, the flow continues to block 528, where the operations for the first power save interval are completed and the second trigger frame transmission sequence associated with a second power save interval is determined.

At block 528, operations for a next trigger frame transmission sequence are initiated. The operations described above beginning at block 510 are repeated for the second trigger frame transmission sequence associated with the second power save interval. As described above, the access point 102 can divide each beacon interval into multiple power save intervals and in each power save interval the access point can transmit trigger frames to WLAN devices in a different trigger frame transmission sequence. The operations described above in blocks 510 to 526 of FIG. 5 and FIG. 6, which are performed during the first power save interval, are similarly performed during the second power save interval and all subsequent power save intervals of the current beacon interval.

In some implementations, after the data communication unit 106 in the access point 102 determines that there are no additional WLAN devices to which trigger frames should be transmitted (at block 526), the power saving unit 104 in the access point 102 can cause processing components of the access point 102 to enter the inactive power state. At the start of a next power save interval, the power saving unit 104 can cause the processing components of the access point 102 to enter the active power state. Additionally, the data communication unit 106 can transmit downlink data frames (if any), determine a new trigger frame transmission sequence, transmit trigger frames in accordance with the new trigger frame transmission sequence, and receive uplink data frames (if any) as was described with reference to FIGS. 5 and 6.

Figure 7:
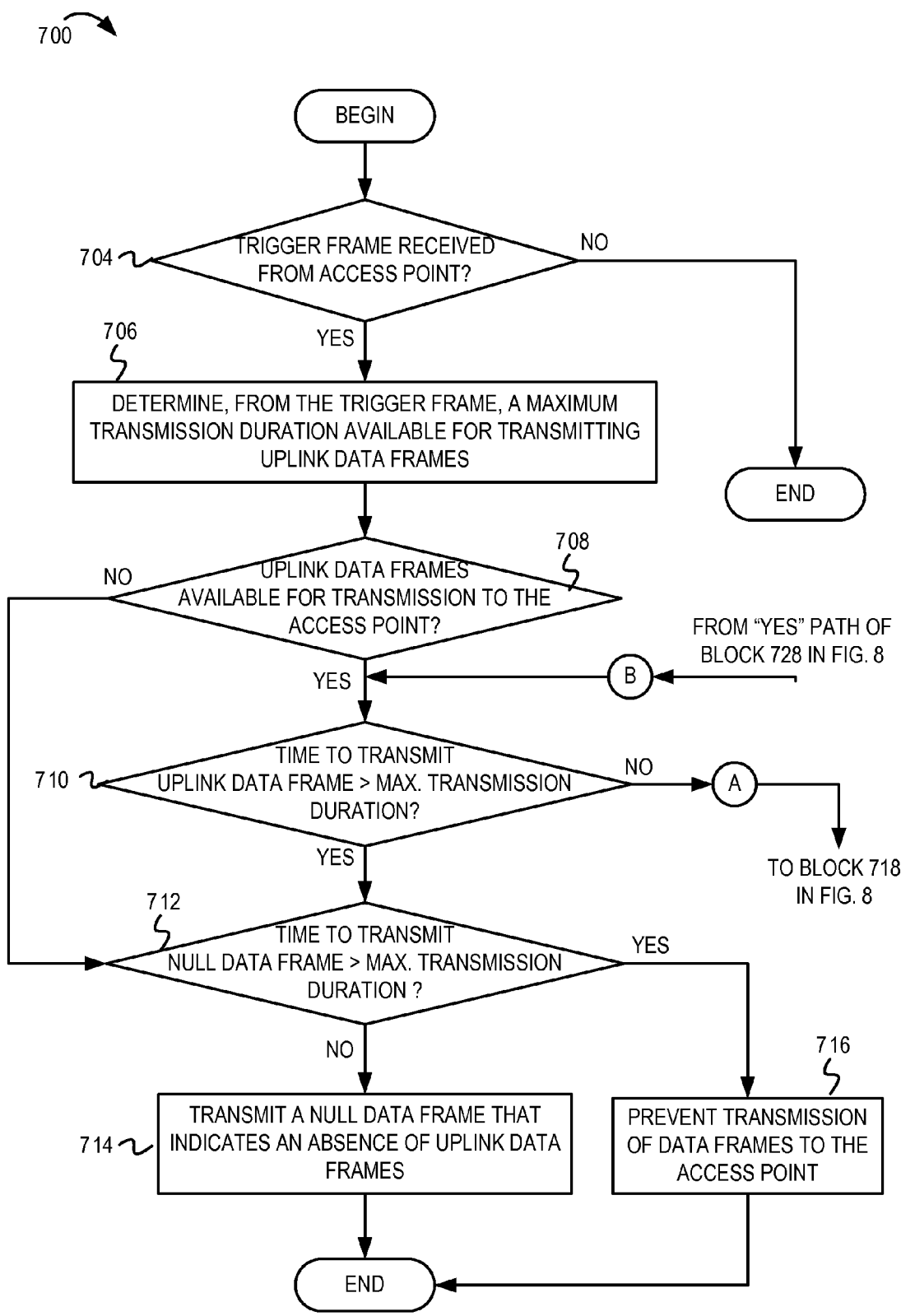
FIG. 7 depicts a flow diagram illustrating example operations of a WLAN device communicating with an access point during a power save communication mode.
Figure 8:
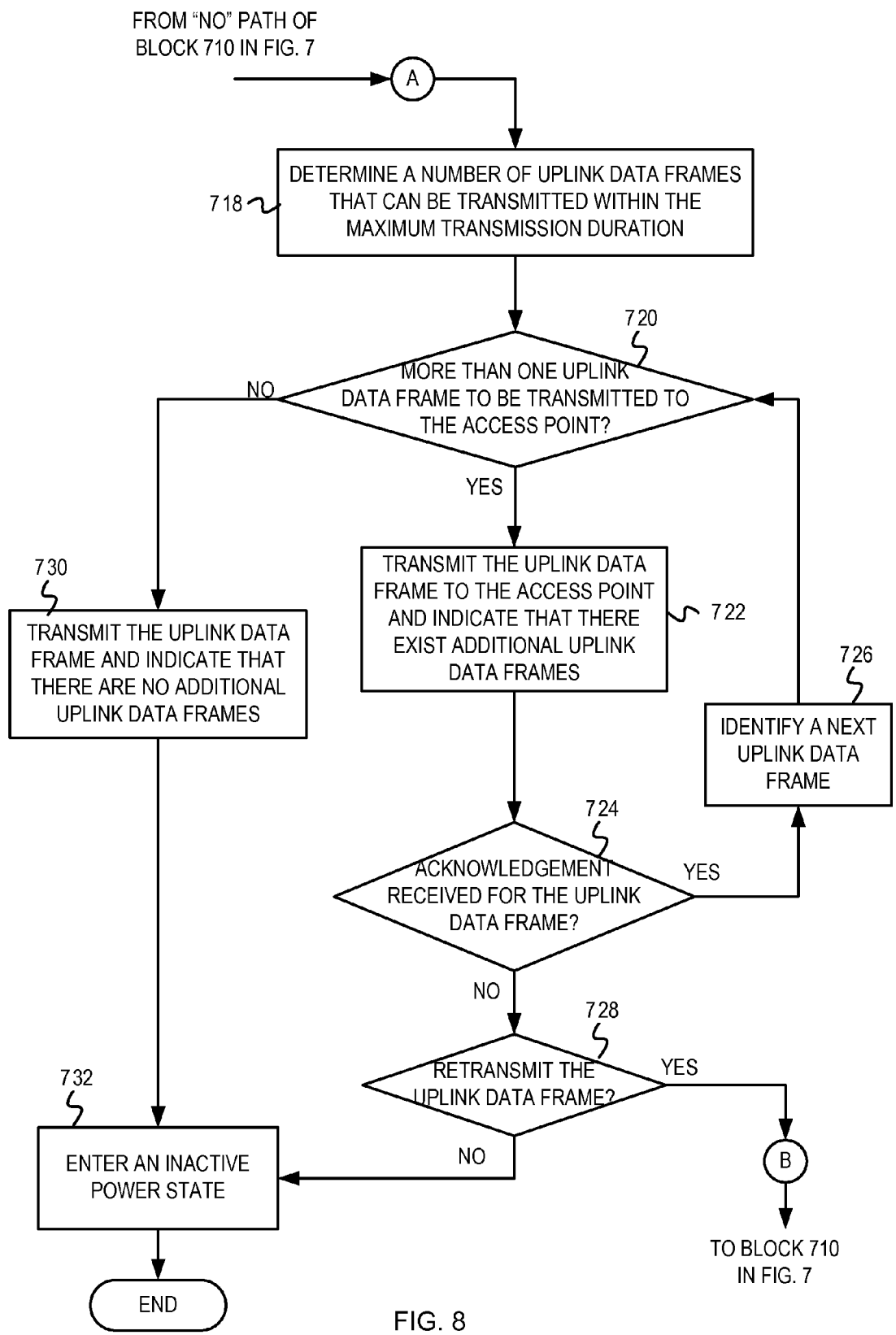
FIG. 8 depicts the flow diagram illustrating example operations of the WLAN device communicating with the access point during a power save communication mode.

FIG. 7 and FIG. 8 depict a flow diagram 700 illustrating example operations of a WLAN device communicating with an access point during a power save communication mode. The flow 700 begins at block 704 in FIG. 7.

A block 704, it is determined whether a trigger frame was received from an access point. For example, in FIG. 1, the data communication unit 114 in the WLAN device 110 can determine whether the trigger frame was received from the access point 102. The trigger frame (e.g., the trigger frame 250 of FIG. 2B) serves as an indication that the WLAN device 110 should begin transmitting available uplink data frames to the access point 102. If it is determined that the trigger frame was received from the access point, the flow continues at block 706. Otherwise, the flow ends.

At block 706, a maximum transmission duration for transmitting the uplink data frames is determined from the trigger frame. For example, the data communication unit 114 can read the maximum duration field 260 in the trigger frame 250 and can determine the maximum transmission duration for transmitting the uplink data frames to the access point 102. The access point 102 can determine the maximum transmission duration based on a number of connected WLAN devices, based on the length of the beacon interval, based on the length of the power save interval, and/or other factors (as described above with reference to FIG. 6). The flow continues at block 708.

At block 708, it is determined whether uplink data frames are available for transmission to the access point. For example, the data communication unit 114 may access a transmit data buffer and determine whether uplink data frames are available for transmission to the access point 102. If it is determined that uplink data frames are available for transmission to the access point, the flow continues at block 710. Otherwise, the flow continues at block 712.

At block 710, it is determined whether a time to transmit the uplink data frames ("transmission time") is greater than the maximum transmission duration. For example, the data communication unit 114 may determine whether the transmission time is greater than the maximum transmission duration for transmitting the uplink data frames. The data communication unit 114 can determine the transmission time based on knowledge of a number of uplink data frames to be transmitted, a length of the uplink data frames, a data frame transmit rate, etc. In calculating the transmission time, the data communication unit 114 may also take into consideration a time required for receiving acknowledgement frames from the access point 102. If it is determined that the transmission time is greater than the maximum transmission duration for transmitting the uplink data frames, the flow continues at block 712. Otherwise, the flow continues at block 718 in FIG. 8.

At block 712, it is determined whether a time to transmit a NULL data frame is greater than the maximum transmission duration. For example, the data communication unit 114 may determine whether the time to transmit the NULL data frame is greater than the maximum transmission duration. The data communication unit 114 may determine the time to transmit the NULL data frame based on the length of the NULL data frame, a time required to receive an acknowledgement for the NULL data frame, etc. The NULL data frame may be transmitted to indicate, to the access point 102, that the WLAN device 110 will not transmit any uplink data frames to the access point 102. If it is determined that the time to transmit the NULL data frame is greater than the maximum transmission duration, the flow continues at block 716. Otherwise, the flow continues at block 714.

At block 714, the NULL data frame that indicates absence of the uplink data frames is transmitted to the access point. For example, the data communication unit 114 transmits the NULL data frame to indicate that uplink data frames will not be transmitted to the access point 102. In one example, the data communication unit 114 can transmit a first predefined value in a header of the NULL data frame to indicate that the uplink data frames will not be transmitted. For example, the data communication unit 114 can set a "more bit" in the frame control field of the header to "0" (i.e., more bit=0) to indicate the uplink data frames will not be transmitted. The data communication unit 114 may also transmit a NULL data frame if it is determined that the transmission time associated with transmitting an uplink data frame is greater than the maximum transmission duration. In some implementations, the data communication unit 114 may indicate a maximum length of the uplink data frame (or a requisite maximum transmission duration), to the access point 102, as part of transmitting the NULL data frame. From block 714, the flow ends. The power management unit 112 in the WLAN device 110 may cause the WLAN device 110 to enter an inactive power state after the data communication unit 114 receives an acknowledgement for the NULL data frame.

At block 716, transmission of data frames to the access point is prevented. The flow 700 moves from block 712 to block 716 on determining that the time to transmit the NULL data frame and the time to transmit the uplink data frame are greater than the maximum transmission duration. In one implementation, the data communication unit 114 can prevent transmission of the data frames (e.g., uplink data frames, NULL data frame, etc.) to the access point 102. In one implementation, if the NULL data frame cannot be transmitted, the data communication unit 114 may not transmit a notification to the access point 102 to indicate that no uplink data frames will be transmitted. It is noted, however, that in other implementations, the data communication unit 114 may send a notification (i.e., different from the NULL data frame) as long as it can be transmitted before the maximum transmission duration expires. In some implementations, on determining that no data frames should be transmitted to the access point 102, the power management unit 112 may cause the WLAN device 110 to enter the inactive power state. In another implementation, the power management unit 112 may cause the WLAN device 110 to enter the inactive power state after the maximum transmission duration expires. From block 716, the flow ends.

At block 718 in FIG. 8, a number of uplink data frames that can be transmitted within the maximum transmission duration is determined. The flow 700 moves from the "no" path of block 710 in FIG. 7 to block 718 in FIG. 8 if it is determined that the transmission time is less than the maximum transmission duration. In one implementation, the data communication unit 114 can determine the number of uplink data frames that can be transmitted within the maximum transmission duration based on knowledge of the length of the uplink data frames, a data transmission rate, the maximum transmission duration, and the time required to receive acknowledgement frames from the access point 102. The flow continues at block 720.

At block 720, it is determined whether there exists more than one uplink data frame to be transmitted to the access point. For example, the data communication unit 114 determines whether more than one uplink data frame are scheduled to be transmitted to the access point 102. If it is determined that more than one uplink data frame are scheduled to be transmitted to the access point, the flow continues at block 722. Otherwise, the flow continues at block 730.

At block 722, the uplink data frame is transmitted to the access point with an indication that there exist additional uplink data frames scheduled to be transmitted. For example, the data communication unit 114 transmits the uplink data frame with the indication that the data communication unit 114 will transmit additional uplink data frames to the access point 102. In one example, the data communication unit 114 can transmit a second predefined value in the header of the uplink data frame to indicate that additional uplink data frames are scheduled to be transmitted to the access point 102. For example, the data communication unit 114 can set a "more bit" in a frame control field of the header to "1" (i.e., more bit=1) to indicate that additional uplink data frames will be transmitted to the access point 102. The flow continues at block 724.

At block 724, it is determined whether an acknowledgement for the uplink data frame was received. For example, the data communication unit 114 can determine whether the acknowledgement from the uplink data frame was received from the access point 102. The data communication unit 114 can wait for a predefined time interval to receive the acknowledgement from the access point 102. If it is determined that acknowledgement for the uplink data frame was received, the flow continues at block 726. Otherwise, the flow continues at block 728.

At block 726, a next uplink data frame scheduled to be transmitted to the access point is identified. For example, the data communication unit 114 identifies the next uplink data frame to be transmitted to the access point 102. The data communication unit 114 may access the transmit data buffer and may retrieve the next uplink data frame to be transmitted to the access point 102. The flow continues at block 720, where it is determined whether the next uplink data frame is the last frame to be transmitted to the access point.

At block 728, it is determined whether the uplink data frame should be retransmitted. For example, the data communication unit 114 can determine whether the uplink data frame should be retransmitted to the access point 102. The flow 700 moves from block 724 to block 728 if the data communication unit 114 determines that the acknowledgement for the uplink data frame was not received from the access point 102. For example, the data communication unit 114 may determine whether the uplink data frame can be retransmitted to the access point 102 without exceeding the maximum transmission duration. As another example, the data communication unit 114 may also determine whether a maximum number of retransmission attempts have been attempted. If it is determined that the uplink data frame cannot be retransmitted to the access point 102, the flow continues at block 732, where the WLAN device 110 enters the inactive power state. Otherwise, the flow continues at block 710 in FIG. 7, where it is determined whether the uplink data frame can be retransmitted without exceeding the maximum transmission duration.

At block 730, the uplink data frame is transmitted with an indication that there are no additional uplink data frames to be transmitted. For example, the data communication unit 114 can transmit the uplink data frame with the indication that no additional uplink data frames will be transmitted to the access point 102. The flow 700 moves from block 720 to block 730 if it determined that the uplink data frame is the last frame to be transmitted to the access point 102. To indicate that no additional uplink data frames will be transmitted to the access point 102, the data communication unit 114 can transmit the first predefined value in the header of the uplink data frame. For example, the data communication unit 114 can set the "more bit" in the frame control field of the header to "0" (i.e., more bit=0) to indicate the absence of additional uplink data frames. Although not depicted in FIG. 8, it is noted that after the data communication unit 114 transmits the uplink data frame, the data communication unit 114 may determine whether an acknowledgement frame for the uplink data frame was received from the access point 102, similarly as described with reference to blocks 724 and 728. The flow continues at block 732.

At block 732, the WLAN device enters the inactive power state. For example, the power management unit 112 in the WLAN device 110 may cause processing components (e.g., the data communication unit 114) of the WLAN device 110 to enter the inactive power state. The power management unit 112 can transmit a notification to the processing components indicating that the WLAN device 110 will enter the inactive power state (e.g., a low powered state, a sleep mode, etc.). From block 732, the flow ends.

It is noted that although not depicted in FIG. 7, the power management unit 114 in the WLAN device 110 can cause processing components of the WLAN device 110 (e.g., the data communication unit 114) to enter the active power state at the beginning of a power save interval. In some embodiments, the data communication unit 114 can receive downlink data frames (if any) from the access point 102. The data communication unit 114 can also receive the trigger frame (at block 702) in accordance with a trigger frame transmission sequence, after the access point 102 transmits all its buffered downlink data frames.

Figure 9:
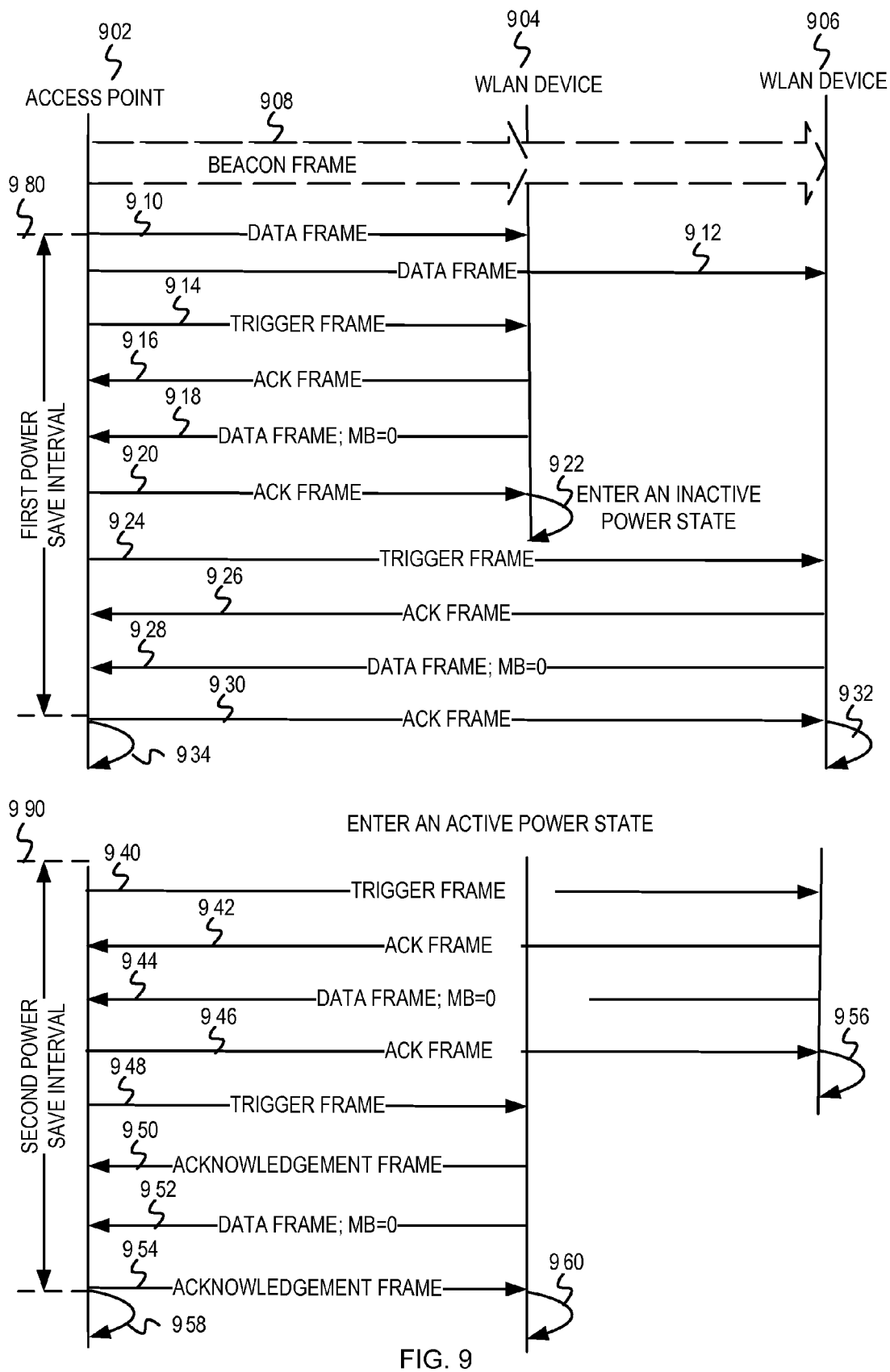
FIG. 9 is a sequence diagram illustrating exchange of data frames during two power save intervals.

FIG. 9 is a sequence diagram illustrating exchange of data frames during two power save intervals. FIG. 9 depicts an access point 902 and two WLAN devices—a WLAN device 904 and a WLAN device 906. The access point 902 transmits a beacon frame 908 to the WLAN devices 904 and 906. The beacon frame 908 can comprise power save parameters that indicate whether a power save communication mode is enabled, a power save interval, etc. as described with reference to FIG. 2A. At the start of a first power save interval 980, the access point 902 transmits downlink data frame(s) 910 to the WLAN device 904. The access point 902 also transmits downlink data frame(s) 912 to the WLAN device 906. The downlink data frames 910 and 912 transmitted to the WLAN devices 904 and 906, respectively, may be buffered data frames received from other connected WLAN devices, other access points, management and control frames from the access point 902, etc. After the access point 902 transmits the downlink data frames to the WLAN devices 904 and 906, the access point 902 transmits a trigger frame 914 to the WLAN device 904. The WLAN device 904 transmits an acknowledgement frame 916 to indicate that the WLAN device 904 received the trigger frame 914. The WLAN device 904 transmits, to the access point 902, an uplink data frame 918 with a "more bit" (MB) set to zero (MB=0) to indicate that the WLAN device 904 will not transmit additional uplink data frames to the access point 902. The access point 902 transmits an acknowledgement frame 920 to indicate that the access point 902 received the uplink data frame 918 from the WLAN device 904. After the WLAN device 904 receives the acknowledgement frame 920, the WLAN device 904 enters the inactive power state as depicted by the arrow 922. The access point 902 then transmits a trigger frame 924 to the WLAN device 906. The WLAN device 906 transmits an acknowledgement frame 926 to indicate that the WLAN device 906 received the trigger frame 924. The WLAN device 906 transmits, to the access point 902, an uplink data frame 928 with MB=0 to indicate that the WLAN device 906 will not transmit additional uplink data frames to the access point 902. The access point 902 transmits an acknowledgement frame 930 to indicate that the access point 902 received the uplink data frame 928 from the WLAN device 906. After the WLAN device 906 receives the acknowledgement frame 930, the WLAN device 906 enters the inactive power state as depicted by the arrow 932. The access point 902 may also enter the inactive power state as depicted by the arrow 934.

At a second power save interval 990, the access point 902, the WLAN device 904, and the WLAN device 906 enter the active power state. During the second power save interval 990, the access point 902 determines that downlink data frames are not available for the WLAN devices 904 and 906. Therefore, the access point 902 does not transmit downlink data frames. However, in the second power save interval 990, the access point 902 changes a trigger frame transmission sequence (as described with reference to block 508 in FIG. 5). The access point 902 changes the trigger frame transmission sequence in an effort to maintain uniform power consumption across the WLAN devices 904 and 906. As depicted in the first power save interval 980, the access point 1002 first transmits the trigger frame 914 to the WLAN device 904 and then transmits the trigger frame 924 to the WLAN device 906. Therefore, during the second power save interval 990, the access point 902 first transmits the trigger frame 940 to the WLAN device 906 and then transmits the trigger frame 948 to the WLAN device 904.

The access point 902 transmits the trigger frame 940 to the WLAN device 906. The WLAN device 906 then transmits an acknowledgement frame 942 to indicate that the WLAN device 906 received the trigger frame 940. The WLAN device 904 transmits, to the access point 902, an uplink data frame 944 with MB=0 indicating that the WLAN device 906 will not transmit additional uplink data frames to the access point 902. The access point 902 transmits an acknowledgement frame 946 to indicate that the access point 902 received the uplink data frame 944. After the WLAN device 906 receives the acknowledgement frame 946, the WLAN device 906 enters the inactive power state as depicted by the arrow 956. The access point 902 then transmits a trigger frame 948 to the WLAN device 904 in accordance with the trigger frame transmission sequence. The WLAN device 904 transmits an acknowledgement frame 950 to indicate reception of the trigger frame 948. The WLAN device 904 transmits an uplink data frame 952 with MB=0 to indicate that the WLAN device 904 will not transmit additional uplink data frames to the access point 902. The access point 902 transmits an acknowledgement frame 954 in response to receiving the uplink data frame 952. The WLAN device 904 then enters the inactive power state as depicted by the arrow 960. Likewise, the access point 902 may also enter the inactive power state as depicted by the arrow 958.

Figure 10:
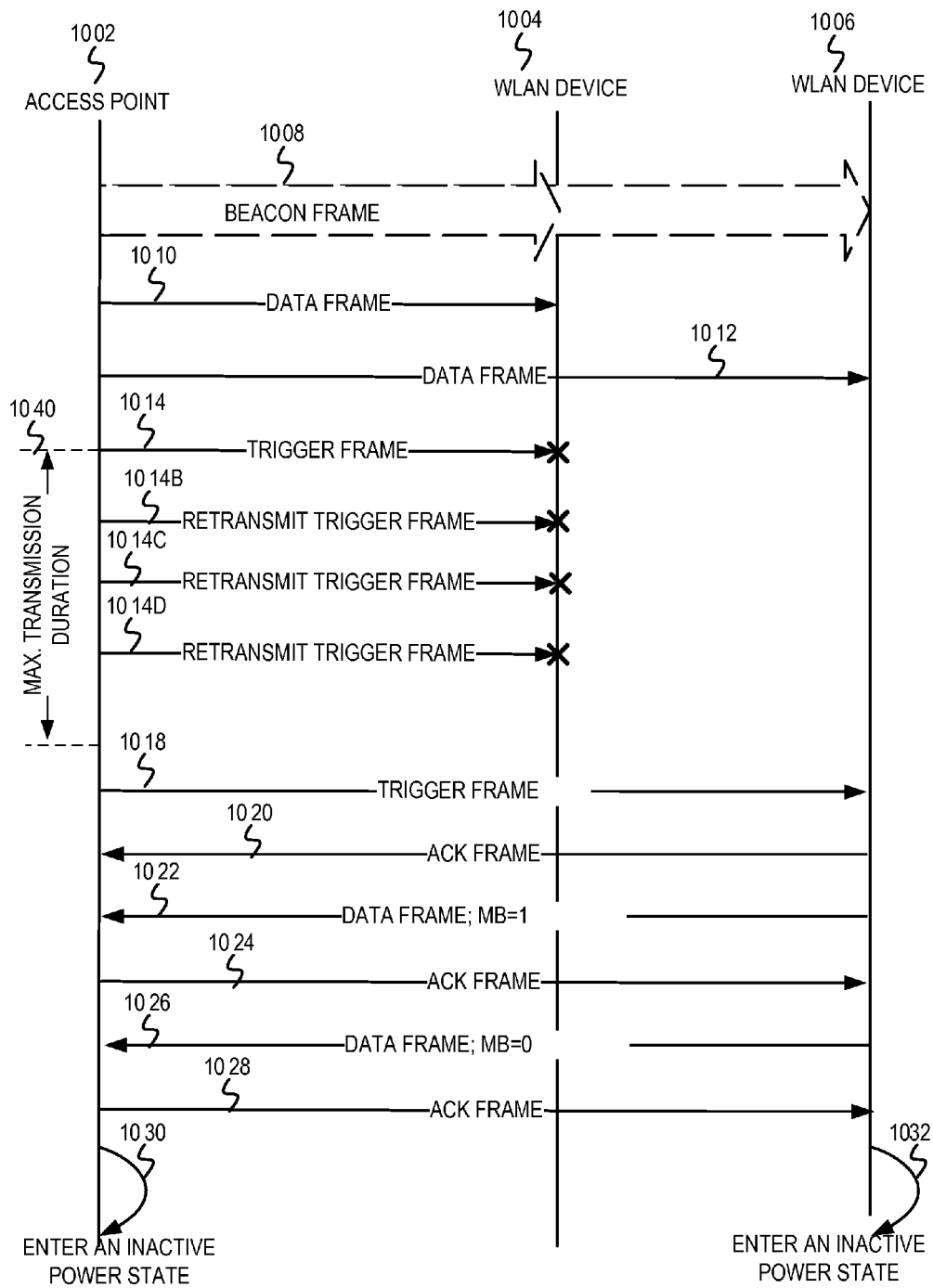
FIG. 10 is a sequence diagram illustrating a retransmission time-out for a trigger frame transmitted by the access point.

FIG. 10 is a sequence diagram illustrating a retransmission time-out for a trigger frame transmitted by an access point. FIG. 10 depicts the access point 1002, the WLAN device 1004, and the WLAN device 1006. The access point 1002 transmits a beacon frame 1008 to the WLAN devices 1004 and 1006. The access point 1002 transmits downlink data frame(s) 1010 to the WLAN device 1004 and downlink data frame(s) 1012 to the WLAN device 1006. After the access point 1002 transmits the downlink data frames, the access point 1002 transmits a trigger frame 1014 to the WLAN device 1004. In the trigger frame 1014, the access point 1002 indicates a maximum transmission duration 1040 allotted to the WLAN device 1004 for transmission of uplink data frames. Because the access point 1002 does not receive an acknowledgement for the trigger frame 1014 from the WLAN device 1004, the access point retransmits the trigger frames as depicted by trigger frames 1014B, 1014C, and 1014D.

After the maximum transmission duration 1040 expires, the access point 1002 transmits a trigger frame 1018 to the WLAN device 1006. The WLAN device 1006 transmits an acknowledgement frame 1020 to indicate that the WLAN device 1006 received the trigger frame 1018. The WLAN device 1006 transmits, to the access point 1002, an uplink data frame 1022 with MB=1 to indicate that the WLAN device 1006 will transmit additional uplink data frames to the access point 1002. The access point 1002 transmits an acknowledgement frame 1024 to indicate that the access point 1002 received the uplink data frame 1022 from the WLAN device 1006. The WLAN device 1006 transmits an uplink data frame 1026 with MB=0 to indicate that the WLAN device 1006 will not transmit additional uplink data frames to the access point 1002. The access point 1002 transmits an acknowledgement frame 1028 to indicate that the access point 1002 received the uplink data frame 1026 from the WLAN device 1006. After the WLAN device 1006 receives the acknowledgement frame 1028, the WLAN device 1006 enters the inactive power state as depicted by the arrow 1032. The access point 1002 can also enter the inactive power state as depicted by the arrow 1030. The WLAN device 1004, however, does not enter the inactive power state because the WLAN device 1004 did not receive the trigger frame 1014 from the access point 1002. It is noted, however, that in other implementations, the WLAN device 1004 may enter the inactive state if the WLAN device 1004 does not receive the trigger frame after a predetermined time interval (e.g., after a time interval equal to the duration of the power save interval).

Figure 11:
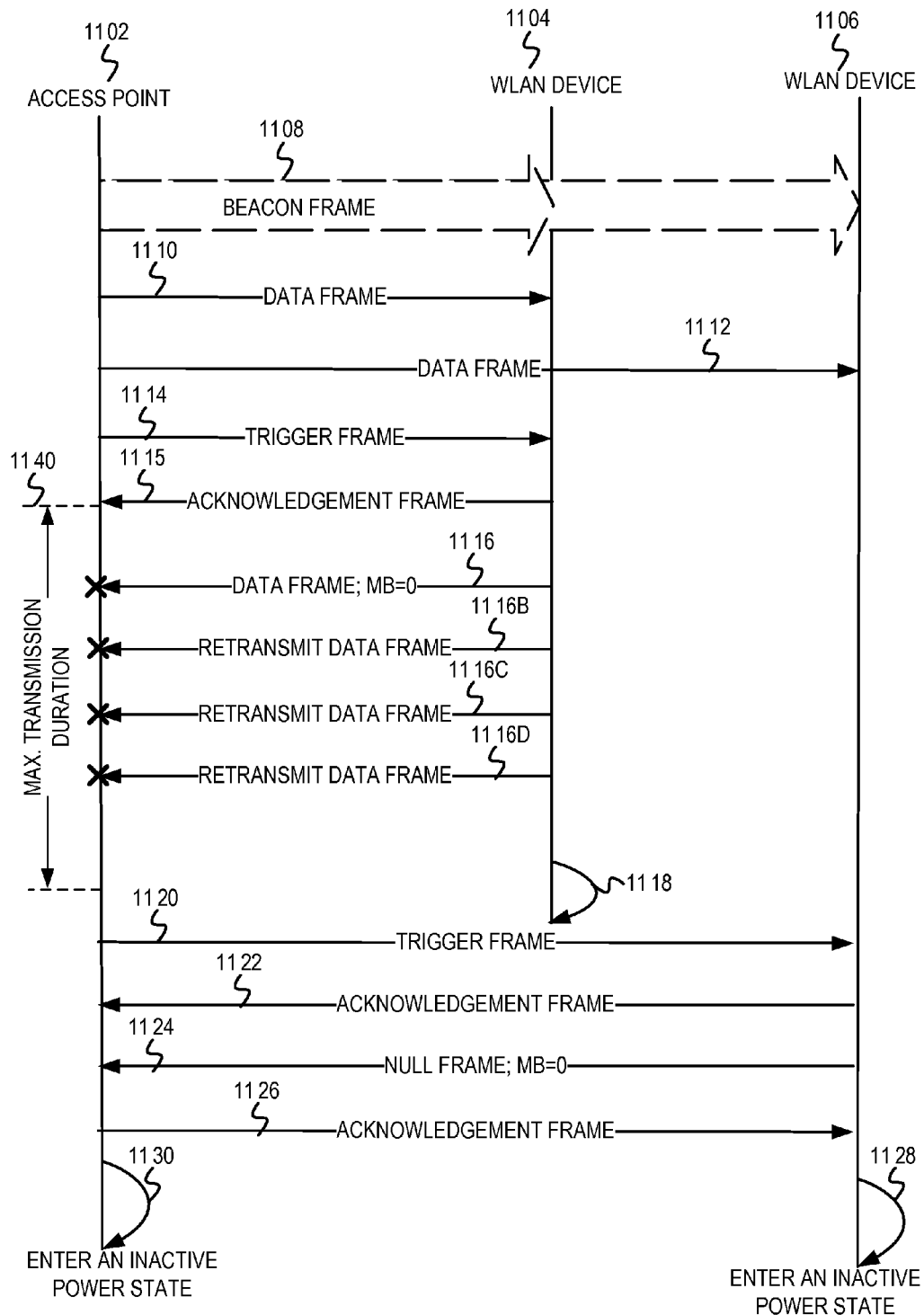
FIG. 11 is a sequence diagram illustrating a retransmission time-out for an uplink data frame transmitted by a WLAN device.

FIG. 11 is a sequence diagram illustrating a retransmission time-out for an uplink data frame transmitted by a WLAN device. FIG. 11 depicts the access point 1102, the WLAN device 1104, and the WLAN device 1106. The access point 1102 transmits a beacon frame 1108 to the WLAN devices 1104 and 1106. The access point 1102 transmits downlink data frames 1110 to the WLAN device 1104 and downlink data frames 1112 to the WLAN device 1106. The access point 1102 then transmits a trigger frame 1114 to the WLAN device 1104. In response to receiving the trigger frame 1114, the WLAN device 1104 transmits an acknowledgement frame 1115 to the access point 1102. The WLAN device 1104 transmits an uplink data frame 1116 with MB=0 to the access point 1102 to indicate that the WLAN device 1104 will not transmit additional uplink data frames to the access point 1102. Because the WLAN device 1104 does not receive an acknowledgement frame from the access point 1102, the WLAN device 1104 retransmits the uplink data frame as indicated by the uplink data frames 1116B, 1116C, and 1116D. As described above, the access point 1102 allots a maximum transmission duration 1140 to the WLAN device 1104 for transmission of the uplink data frames. After the maximum transmission duration 1140 expires, the WLAN device 1104 enters the inactive power state as depicted by the arrow 1118.

Also, after the maximum transmission duration 1140 allotted to the WLAN device 1104 expires, the access point 1102 transmits a trigger frame 1120 to the WLAN device 1106. The WLAN device 1106 transmits an acknowledgement frame 1122 to indicate that the WLAN device 1106 received the trigger frame 1120. The WLAN device 1106 transmits a NULL data frame 1124 with MB=0 to indicate that the WLAN device 1106 does not have any uplink data frames for the access point 1102. The access point 1102 transmits an acknowledgement frame 1126 to indicate that the access point 1102 received the NULL data frame 1124 from the WLAN device 1106. After the WLAN device 1106 receives the acknowledgement frame 1124, the WLAN device 1106 enters the inactive power state as depicted by the arrow 1128. The access point 1102 may also enter the inactive power state as depicted by the arrow 1130.

It should be understood that FIGS. 1-11 are examples meant to aid in understanding embodiments and should not be used to limit embodiments or limit scope of the claims. Embodiments may perform additional operations, fewer operations, operations in a different order, operations in parallel, and some operations differently. For example, although FIG. 1 indicates the access point 102 transmitting the power save parameters as part of the beacon frame, the access point 102 and/or the WLAN devices 104 and 106 may also transmit the power save parameters in other suitable frames. For example, the access point 102 can also transmit the power save parameters in an enhanced distributed channel access (EDCA) frame, a probe response frame, an association response frame, a reassociation response frame, etc. to indicate that the access point 102 supports a power save communication mode, as described above with reference to FIGS. 1-11 and to indicate the power save parameters to the WLAN devices 104 and 106. Additionally, the WLAN devices 104 and 106 can transmit the power save parameters in an association request frame, a reassociation request frame, etc. to indicate that the WLAN devices support the power save communication mode and to indicate the power save parameters to the access point 102.

Although FIGS. 1 and 5 describe the access point dividing the beacon interval into multiple power save intervals based on the number of connected WLAN devices, embodiments are not so limited. In other embodiments, each beacon interval may constitute one power save interval. The trigger frame transmission sequence according to which the connected WLAN devices are accessed may be varied from one beacon interval to another to try to achieve approximately uniform power consumption across the connected WLAN devices. With reference to FIG. 1, during a first beacon interval, the access point 102 may first access (e.g., transmit the trigger frame to and receive uplink data frames from) the WLAN device 110, followed by the WLAN device 120. During a second beacon interval, the access point 102 may first access the WLAN device 120, followed by the WLAN device 110, and so on.

Although FIGS. 5-6 depicts the access point transmitting all the buffered downlink data frames to the connected WLAN devices prior to requesting uplink data frames from each of the connected WLAN devices, embodiments are not so limited. In other embodiments, the access point may not transmit all the buffered downlink data frames prior to requesting uplink data frames from each of the connected WLAN devices. For example, the access point 102 may transmit downlink data frames to a first WLAN device 110, transmit the trigger frame, and receive uplink data frames from the WLAN device 110. After receiving uplink data frames, the access point 102 may then transmit downlink data frames to a second WLAN device 120, transmit the trigger frame to and receive uplink data frames from the second WLAN device 120, and so on.

It is noted that although FIG. 1 describes the access point dividing a beacon interval into multiple power save intervals, embodiments are not so limited. For example, in some implementations, the beacon interval may not be divided into multiple power save intervals. The access point may successively request uplink data frames from each of the connected WLAN devices. Additionally, although FIG. 1 describes the access point 102 dividing the beacon interval into power save intervals depending on the number of connected WLAN devices, embodiments are not so limited. The access point may take into consideration the amount of time required for other transmissions when determining the power save interval. For example, if the beacon interval is 200 ms, the access point may allocate 20 ms for responding to management request frames (e.g., transmitting probe responses, association responses, etc.). The access point may divide the remaining time (i.e., 180 ms) by the number of connected WLAN devices, to yield a power save interval of 45 ms.

Lastly, it is noted that although FIGS. 1, 7, and 8 depict the WLAN device transmitting a NULL data frame or not transmitting any data frames to the access point 102, if it is determined that the uplink data frame cannot be transmitted within the maximum transmission duration, embodiments are not so limited. In other implementations, on determining that the uplink data frame cannot be transmitted within the maximum transmission duration, the WLAN device may fragment the uplink data frame into multiple smaller uplink data frames (if possible). The WLAN device may transmit as many fragments of the uplink data frame as can be transmitted within the maximum transmission duration. The access point 102 can buffer the received fragments of the uplink data frame and route the data frame to the appropriate destination WLAN device after all the fragments of the uplink data frame are received.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 12:
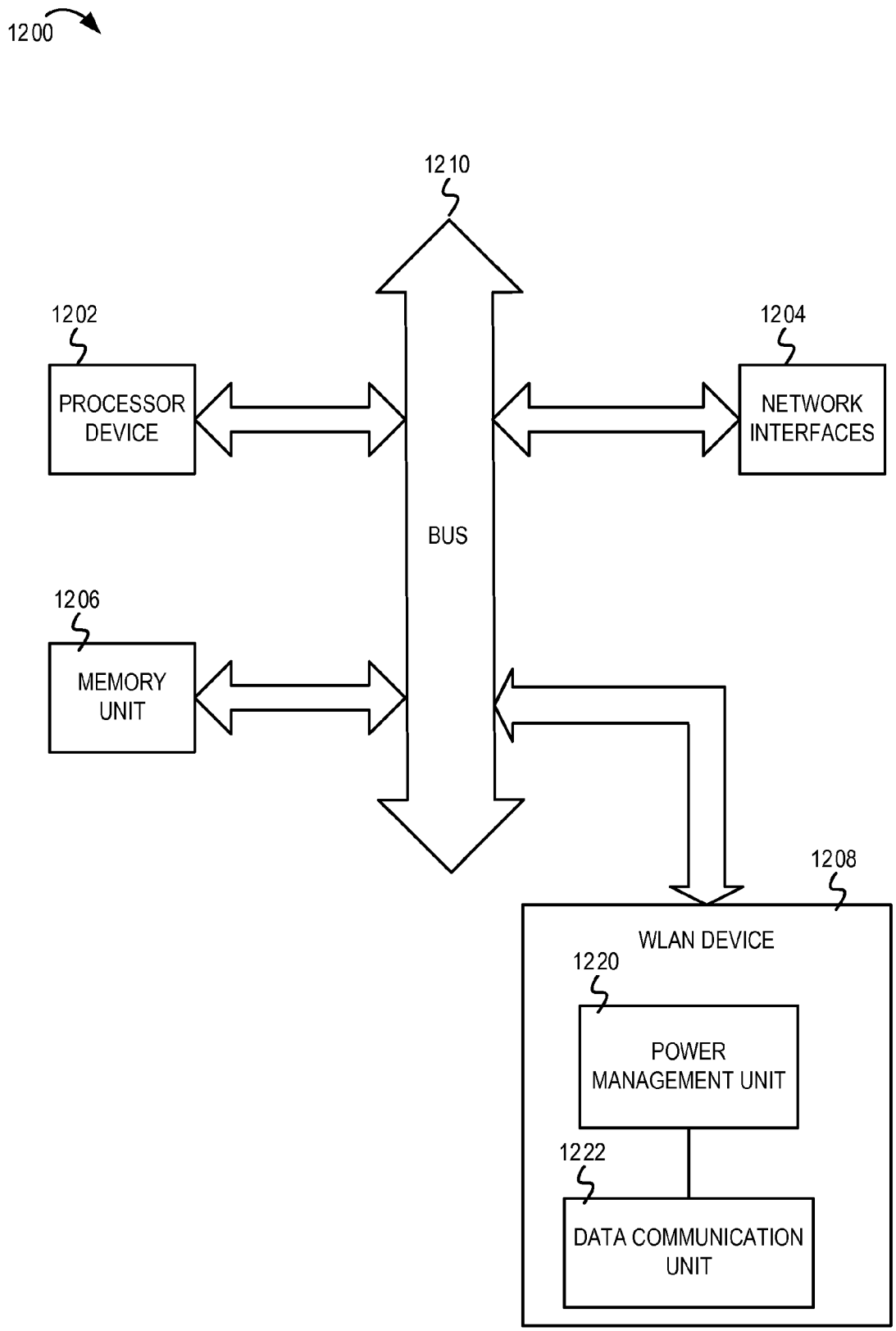
FIG. 12 is a block diagram of one embodiment of an electronic device including a power save communication mechanism

FIG. 12 is a block diagram of one embodiment of an electronic device 1200 including a power save communication mechanism. In some implementations, the electronic device 1200 may be one of a personal computer (PC), a laptop, a netbook, a mobile phone, a personal digital assistant (PDA), or other electronic systems comprising a WLAN device. The electronic device 1200 includes a processor device 1202 (possibly including multiple processors, multiple cores, multiple nodes, and/or implementing multi-threading, etc.). The electronic device 1200 includes a memory unit 1206. The memory unit 1206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1200 also includes a bus 1210 (e.g., PCI, ISA, PCI-Express, HyperTransport®, InfiniBand®, NuBus, etc.), and network interfaces 1204 that include at least one wireless network interface (e.g., a WLAN interface, a Bluetooth® interface, a WiMAX interface, a ZigBee® interface, a Wireless USB interface, etc.).

The electronic device 1200 also includes a WLAN device 1208. The WLAN device 1208 comprises power management unit 1220 coupled to a data communication unit 1222. The data communication unit 1222 implements functionality to transmit uplink data frames (if available) to an access point (not shown) in response to receiving a trigger frame from the access point, as described with reference to FIGS. 1-11. The power management unit 1220 implements functionality to cause processing components of the WLAN device 1208 to enter an inactive power state after the data communication unit 1222 receives and/or responds to the trigger frame from the access point. The power management unit 1220 also implements functionality to cause processing components of the WLAN device 1208 to enter an active power state at the start of each power save interval to receive downlink data frames and the trigger frame from the access point, as described with reference to FIGS. 1-11. It should be noted that any one of the above-described functionalities might be partially (or entirely) implemented in hardware and/or on the processor device 1202. For example, the functionality may be implemented with an application specific integrated circuit, in logic implemented in the processor device 1202, in a co-processor on a peripheral device or card, etc. Further, realizations may include fewer or additional components not illustrated in FIG. 12 (e.g., additional network interfaces, peripheral devices, etc.). The processor device 1202 and the network interfaces 1204 are coupled to the bus 1210. Although illustrated as being coupled to the bus 1210, the memory unit 1206 may be coupled to the processor unit 1202.

While the embodiments are described with reference to various implementations and exploitations, it will be understood that these embodiments are illustrative and that the scope of the inventive subject matter is not limited to them. In general, a power save communication mechanism for wireless communication systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at an access point in a wireless communication system, that a plurality of wireless network devices of the wireless communication system are communicatively connected to the access point;
    determining a number of power save intervals to implement in each beacon interval during a power save communication mode of the wireless communication system based, at least in part, on a number of wireless network devices that are communicatively connected to the access point, each of the power save intervals providing opportunities for the wireless network devices to receive trigger frames from the access point requesting transmission of uplink data frames;
    determining a trigger frame transmission sequence for each of the power save intervals, the trigger frame transmission sequence indicating an order according to which the access point communicates with each of the plurality of wireless network devices communicatively connected to the access point during each of the power save intervals, wherein a first trigger frame transmission sequence for a first power save interval is different than a second trigger frame transmission sequence for a second power save interval; and
    transmitting a beacon frame to initiate a beacon interval, the beacon frame comprising an indication of a duration of each of the power save intervals;
    transmitting, in accordance with the trigger frame transmission sequence for a current power save interval, a trigger frame to at least a first wireless network device of the plurality of wireless network devices to request transmission of uplink data frames from the first wireless network device.

2. The method of claim 1, further comprising determining a maximum transmission duration allocated to each wireless network device of the plurality of wireless network devices during each power save interval for transmission of the uplink data frames to the access point, wherein the maximum transmission duration is determined based, at least in part, on the duration of each of the power save intervals and the number of wireless network devices communicatively connected to the access point.

3. The method of claim 2, further comprising determining the duration of each of the power save intervals based, at least in part, on a duration of the beacon interval and the number of wireless devices that are communicatively connected to the access point.

4. The method of claim 2, wherein the trigger frame transmitted to the first wireless network device comprises an indication of the maximum transmission duration allocated to the first wireless network device for said transmission of the uplink data frames.

5. The method of claim 1, further comprising:
    determining that an acknowledgement frame for the trigger frame was not received from the first wireless network device;
    determining whether to retransmit the trigger frame to the first wireless network device based on said determining that the acknowledgement frame for the trigger frame was not received from the first wireless network device;
    retransmitting the trigger frame to the first wireless network device in response to determining that the trigger frame should be retransmitted to the first wireless network device;
    determining whether to transmit a second trigger frame to a second wireless network device of the plurality of wireless network devices in response to determining that the trigger frame should not be retransmitted to the first wireless network device.

6. The method of claim 5, wherein said determining whether to transmit the second trigger frame to the second wireless network device comprises identifying the second wireless network device to transmit the second trigger frame from the trigger frame transmission sequence and determining whether a maximum transmission duration allotted to the first wireless network device for transmission of uplink data frames has expired.

7. The method of claim 1, further comprising determining the trigger frame transmission sequence to vary the order according to which the access point communicates with each of the plurality of wireless network devices communicatively connected to the access point in each of the power save intervals.

8. The method of claim 1, further comprising, after transmitting trigger frames to the plurality of wireless network devices during the first power save interval according to the first trigger frame transmission sequence associated with the first power save interval, transmitting trigger frames to the plurality of wireless network devices during the second power save interval according to the second trigger frame transmission sequence associated with the second power save interval.

9. The method of claim 1, wherein the plurality of wireless network devices are wireless local area network (WLAN) devices.

10. A method of comprising:
    receiving, at an access point in a wireless communication system, a management frame from a first wireless network device that indicates initiation of management operations between the first wireless network device and the access point;
    reading, from the management frame, power save parameters associated with the first wireless network device, wherein the power save parameters comprise a power save communication mode status and a duration of each of a number of power save intervals in each beacon interval during a power save communication mode;
    determining whether the power save parameters associated with the first wireless network device match power save parameters associated with the access point;
    indicating success of the management operations between the first wireless network device and the access point in response to determining that the power save parameters associated with the first wireless network device match the power save parameters associated with the access point; and indicating failure of the management operations between the first wireless network device and the access point in response to determining that the power save parameters associated with the first wireless network device do not match the power save parameters associated with the access point.

11. The method of claim 10, further comprising:
determining, at the access point, that a plurality of wireless network devices of the wireless communication system are communicatively connected to the access point;
determining the number of power save intervals to implement in each beacon interval during the power save communication mode of the wireless communication system based, at least in part, on a number of wireless network devices that are communicatively connected to the access point;
determining a trigger frame transmission sequence for each of the power save intervals, the trigger frame transmission sequence indicating an order according to which the access point communicates with each of the plurality of wireless network devices communicatively connected to the access point during each of the power save intervals; and
transmitting a beacon frame to initiate a beacon interval, the beacon frame comprising an indication of a duration of each of the power save intervals;
transmitting, in accordance with the trigger frame transmission sequence, a trigger frame to the first wireless network device of the plurality of wireless network devices to request transmission of uplink data frames from the first wireless network device.

12. A method comprising:
receiving, at a wireless network device of a wireless communication system, a trigger frame from an access point of the wireless communication system, the trigger frame comprising an indication of a request for transmission of uplink data frames from the wireless network device to the access point and an indication of a maximum transmission duration allocated to the wireless network device for said transmission of the uplink data frames;
in response to said receiving the trigger frame from the access point:
  determining that an uplink data frame is available for transmission from the wireless network device to the access point;
  determining, prior to transmitting the uplink data frame, whether the uplink data frame can be transmitted during the maximum transmission duration based upon whether a transmission time associated with transmitting the uplink data frame is less than the maximum transmission duration allocated to the wireless network device for said transmission of the uplink data frames; and
  transmitting the uplink data frame to the access point in response to determining that the uplink data frame can be transmitted during the maximum transmission duration.

13. The method of claim 12, in response to determining that the uplink data frame cannot be transmitted during the maximum transmission duration allocated to the wireless network device for said transmission of the uplink data frames, the method further comprises:
determining whether a second transmission time associated with transmitting a null data frame is less than the maximum transmission duration in response to determining that the transmission time associated with transmitting the uplink data frame is greater than the maximum transmission duration;
transmitting the null data frame to the access point in response to determining that the second transmission time associated with transmitting the null data frame is less than the maximum transmission duration; and
preventing transmission of the uplink data frame and the null data frame in response to determining that the second transmission time associated with transmitting the null data frame is greater than the maximum transmission duration.

14. The method of claim 12, wherein, in response to said receiving the trigger frame from the access point, the method further comprising:
determining that a second uplink data frame is available for transmission from the wireless network device to the access point;
determining whether a transmission time associated with transmitting the uplink data frame and the second uplink data frame is less than the maximum transmission duration allocated to the wireless network device for said transmission of the uplink data frames;
transmitting a first value in the uplink data frame to indicate that the wireless network device will transmit the second uplink data frame in response to determining that the transmission time associated with transmitting the uplink data frame and the second uplink data frame is less than the maximum transmission duration allocated to the wireless network device; and
transmitting a second value in the uplink data frame to indicate that the wireless network device will not transmit the second uplink data frame in response to determining that the transmission time associated with transmitting the uplink data frame and the second uplink data frame is greater than the maximum transmission duration allocated to the wireless network device.

15. The method of claim 12, wherein said transmitting the uplink data frame to the access point comprises:
determining that an acknowledgement frame for the uplink data frame was not received from the access point;
determining whether to retransmit the uplink data frame to the access point based on said determining that the acknowledgement frame for the uplink data frame was not received from the access point;
retransmitting the uplink data frame to the access point in response to determining that the uplink data frame should be retransmitted to the access point; and
causing the wireless network device to enter an inactive power state in response to determining that the uplink data frame should not be retransmitted to the access point.

16. The method of claim 15, wherein said determining whether to retransmit the uplink data frame to the access point comprises at least one of determining whether the maximum transmission duration has expired and determining whether a maximum number of allowable retransmission attempts have been attempted.

17. The method of claim 12, further comprising:
determining, from the trigger frame, the maximum transmission duration allocated to the wireless network device for said transmission of the uplink data frames;
determining the transmission time for transmitting the uplink data frame from the wireless network device to the access point; and
determining a number of uplink data frames that can be transmitted to the access point based, at least in part, on the maximum transmission duration and the transmission time for transmitting the uplink data frame from the wireless network device to the access point.

18. The method of claim 12, further comprising:
receiving, from the access point, a second trigger frame comprising an indication of a second request for transmission of uplink data frames from the wireless network device;
determining that a second uplink data frame is not available for transmission from the wireless network device to the access point in response to said receiving the second trigger frame from the access point;
determining whether a second transmission time associated with transmitting a null data frame is less than the maximum transmission duration in response to said determining that the second uplink data frame is not available for transmission from the wireless network device to the access point;
transmitting the null data frame to the access point in response to determining that the second transmission time associated with transmitting the null data frame is less than the maximum transmission duration; and
preventing transmission of the null data frame in response to determining that the second transmission time associated with transmitting the null data frame is greater than the maximum transmission duration.

19. The method of claim 12, further comprising:
determining the transmission time associated with transmitting the uplink data frame based, at least in part, upon a length of the uplink data frame and a data frame transmit rate.

20. An access point of a wireless communication system, the access point comprising:
a data communication unit operable to:
determine that a plurality of wireless network devices of the wireless communication system are communicatively connected to the access point;
a power saving unit operable to:
determine a number of power save intervals to implement in each beacon interval during a power save communication mode of the wireless communication system based, at least in part, on a number of wireless network devices that are communicatively connected to the access point, each of the power save intervals providing opportunities for the wireless network devices to receive trigger frames from the access point requesting transmission of uplink data frames;
determine a trigger frame transmission sequence for each of the power save intervals, the trigger frame transmission sequence indicating an order according to which the access point communicates with each of a plurality of wireless network devices communicatively connected to the access point during each of the power save intervals, wherein a first trigger frame transmission sequence for a first power save interval is different than a second trigger frame transmission sequence for a second power save interval;
the data communication unit further operable to:
transmit a beacon frame to initiate a beacon interval, the beacon frame comprising an indication of a duration of each of the power save intervals; and
transmit, in accordance with the trigger frame transmission sequence for a current power save interval, a trigger frame to at least a first wireless network device of the plurality of wireless network devices to request transmission of uplink data frames from the first wireless network device.

21. The access point of claim 20, wherein the trigger frame comprises an indication of a maximum transmission duration allocated to the first wireless network device for said transmission of the uplink data frames and wherein the data communication unit is further operable to determine the maximum transmission duration allocated to the first wireless network device based, at least in part, on the duration of each of the power save intervals and the number of wireless network devices communicatively connected to the access point.

22. The access point of claim 20, wherein the data communication unit is further operable to:
receive, from the first wireless network device, a management frame that indicates initiation of management operations between the first wireless network device and the access point;
read, from the management frame, power save parameters associated with the first wireless network device, wherein the power save parameters comprise a power save communication mode status and the duration of each of the power save intervals;
determine whether the power save parameters associated with the first wireless network device match power save parameters associated with the access point;
indicate success of the management operations between the first wireless network device and the access point in response to the data communication unit determining that the power save parameters associated with the first wireless network device match the power save parameters associated with the access point; and
indicate failure of the management operations between the first wireless network device and the access point in response to the data communication unit determining that the power save parameters associated with the first wireless network device do not match the power save parameters associated with the access point.

23. A wireless network device of a wireless communication system, the wireless network device comprising:
a processor device;
a network interface communicatively coupled to the processor device; and
a data communication unit communicatively coupled to the network interface and the processor device, the data communication unit operable to:
receive a trigger frame from an access point of the wireless communication system, the trigger frame comprising an indication of a request for transmission of uplink data frames from the wireless network device to the access point and an indication of a maximum transmission duration allocated to the wireless network device for said transmission of the uplink data frames;
in response to the data communication unit receiving the trigger frame from the access point:
determine that an uplink data frame is available for transmission to the access point;
determine, prior to transmitting the uplink data frame, whether the uplink data frame can be transmitted during the maximum transmission duration based upon whether a transmission time associated with transmitting the uplink data frame is less than the maximum transmission duration allocated to the wireless network device for said transmission of the uplink data frames; and
transmit the uplink data frame to the access point in response to the data communication unit determining that the uplink data frame can be transmitted during the maximum transmission duration.

24. The wireless network device of claim 23, wherein in response to the data communication unit determining that the uplink data frame cannot be transmitted during the maximum transmission duration allocated to the wireless network device for said transmission of the uplink data frames, the data communication unit is further operable to:
- determine whether a second transmission time associated with transmitting a null data frame is less than the maximum transmission duration in response to the data communication unit determining that the transmission time associated with transmitting the uplink data frame is greater than the maximum transmission duration;
- transmit the null data frame to the access point in response to the data communication unit determining that the second transmission time associated with transmitting the null data frame is less than the maximum transmission duration; and
- prevent transmission of the uplink data frame and the null data frame in response to the data communication unit determining that the second transmission time associated with transmitting the null data frame is greater than the maximum transmission duration.

25. The wireless network device of claim 23 wherein, in response to the data communication unit receiving the trigger frame from the access point, the data communication unit is operable to:
- determine that a second uplink data frame is available for transmission to the access point;
- determine whether a transmission time associated with transmitting the uplink data frame and the second uplink data frame is less than the maximum transmission duration allocated to the wireless network device for said transmission of the uplink data frames;
- transmit a first value in the uplink data frame to indicate that the wireless network device will transmit the second uplink data frame in response to the data communication unit determining that the transmission time associated with transmitting the uplink data frame and the second uplink data frame is less than the maximum transmission duration allocated to the wireless network device; and
- transmit a second value in the uplink data frame to indicate that the wireless network device will not transmit the second uplink data frame in response to the data communication unit determining that the transmission time associated with transmitting the uplink data frame and the second uplink data frame is greater than the maximum transmission duration allocated to the wireless network device.

26. A method comprising:
- receiving, at a wireless network device of a wireless communication system, a trigger frame from an access point of the wireless communication system, the trigger frame comprising an indication of a request for transmission of uplink data frames from the wireless network device to the access point and an indication of a maximum transmission duration allocated to the wireless network device for said transmission of the uplink data frames;
- in response to said receiving the trigger frame from the access point:
  - determining that an uplink data frame is available for transmission from the wireless network device to the access point;
  - determining whether a transmission time associated with transmitting the uplink data frame is less than the maximum transmission duration allocated to the wireless network device for said transmission of the uplink data frames;
  - transmitting the uplink data frame in response to determining that the transmission time associated with transmitting the uplink data frame is less than the maximum transmission duration allocated to the wireless network device; and
  - transmitting a value in a null data frame to indicate that the wireless network device will not transmit the uplink data frame in response to determining that the transmission time associated with transmitting the uplink data frame is greater than the maximum transmission duration allocated to the wireless network device.

27. The method of claim 26, wherein said determining that the transmission time associated with transmitting the uplink data frame is less than the maximum transmission duration allocated to the wireless network device for said transmission of the uplink data frames comprises:
- determining whether a second transmission time associated with transmitting the null data frame is less than the maximum transmission duration in response to determining that the transmission time associated with transmitting the uplink data frame is greater than the maximum transmission duration;
- transmitting the null data frame to the access point in response to determining that the second transmission time associated with transmitting the null data frame is less than the maximum transmission duration; and
- preventing transmission of the uplink data frame and the null data frame in response to determining that the second transmission time associated with transmitting the null data frame is greater than the maximum transmission duration.

28. The method of claim 26, further comprising:
- determining that a second uplink data frame is available for transmission from the wireless network device to the access point;
- determining whether the transmission time associated with transmitting the uplink data frame and the second uplink data frame is less than the maximum transmission duration allocated to the wireless network device for said transmission of the uplink data frames;
- wherein transmitting the uplink data frame includes transmitting a first value in the uplink data frame to indicate that the wireless network device will transmit the second uplink data frame in response to determining that the transmission time associated with transmitting the uplink data frame and the second uplink data frame is less than the maximum transmission duration allocated to the wireless network device; and
- wherein transmitting the uplink data frame includes transmitting a second value in the uplink data frame to indicate that the wireless network device will not transmit the second uplink data frame in response to determining that the transmission time associated with transmitting the uplink data frame and the second uplink data frame is greater than the maximum transmission duration allocated to the wireless network device.

29. The method of claim 26, wherein said transmitting the uplink data frame to the access point comprises:
- determining that an acknowledgement frame for the uplink data frame was not received from the access point;
- determining whether to retransmit the uplink data frame to the access point based on said determining that the acknowledgement frame for the uplink data frame was not received from the access point;

retransmitting the uplink data frame to the access point in response to determining that the uplink data frame should be retransmitted to the access point; and causing the wireless network device to enter an inactive power state in response to determining that the uplink data frame should not be retransmitted to the access point.

30. The method of claim 29, wherein said determining whether to retransmit the uplink data frame to the access point comprises at least one of determining whether the maximum transmission duration has expired and determining whether a maximum number of allowable retransmission attempts have been attempted.

31. The method of claim 26, further comprising:
determining, from the trigger frame, the maximum transmission duration allocated to the wireless network device for said transmission of the uplink data frames;
determining the transmission time for transmitting the uplink data frame from the wireless network device to the access point; and
determining a number of uplink data frames that can be transmitted to the access point based, at least in part, on the maximum transmission duration and the transmission time for transmitting the uplink data frame from the wireless network device to the access point.

32. The method of claim 26, further comprising:
receiving, from the access point, a second trigger frame comprising an indication of a second request for transmission of uplink data frames from the wireless network device;
determining that a second uplink data frame is not available for transmission from the wireless network device to the access point in response to said receiving the second trigger frame from the access point;
determining whether a second transmission time associated with transmitting the null data frame is less than the maximum transmission duration in response to said determining that the second uplink data frame is not available for transmission from the wireless network device to the access point;
transmitting the null data frame to the access point in response to determining that the second transmission time associated with transmitting the null data frame is less than the maximum transmission duration; and
preventing transmission of the null data frame in response to determining that the second transmission time associated with transmitting the null data frame is greater than the maximum transmission duration.

* * * * *